United States Patent [19]
Cavanaugh, III

[11] Patent Number: 5,809,507
[45] Date of Patent: Sep. 15, 1998

[54] METHOD AND APPARATUS FOR STORING PERSISTENT OBJECTS ON A DISTRIBUTED OBJECT NETWORK USING A MARSHALING FRAMEWORK

[75] Inventor: Ken M. Cavanaugh, III, Montara, Calif.

[73] Assignee: Sun Microsystems, Inc., Palo Alto, Calif.

[21] Appl. No.: 677,013

[22] Filed: Jul. 1, 1996

[51] Int. Cl.[6] .................................................. G06F 15/163
[52] U.S. Cl. ........................... 707/103; 707/10; 707/100; 707/101; 395/200.33
[58] Field of Search .................................... 707/103, 101, 707/100, 10; 395/200.03, 200.11, 200.33

[56] References Cited

U.S. PATENT DOCUMENTS

| | | | |
|---|---|---|---|
| 5,291,593 | 3/1994 | Abraham et al. | 395/600 |
| 5,295,256 | 3/1994 | Bapat | 395/500 |
| 5,377,350 | 12/1994 | Skinner | 395/600 |
| 5,414,812 | 5/1995 | Filip et al. | 395/200 |
| 5,499,371 | 3/1996 | Henninger et al. | 395/700 |
| 5,511,197 | 4/1996 | Hill et al. | 395/700 |
| 5,566,302 | 10/1996 | Khalidi et al. | 395/200.09 |
| 5,577,251 | 11/1996 | Hamilton et al. | 395/671 |
| 5,581,760 | 12/1996 | Atkinson et al. | 395/700 |
| 5,632,031 | 5/1997 | Velissaropoulos et al. | 395/611 |
| 5,664,182 | 9/1997 | Nierenberg et al. | 395/613 |

*Primary Examiner*—Wayne Amsbury
*Assistant Examiner*—Jean R. Homere
*Attorney, Agent, or Firm*—Beyer & Weaver, LLP

[57] ABSTRACT

Data structures, methods and devices for implementing persistence data storage such that persistent objects may be efficiently created and accessed in a distributed client/server computing system are disclosed. In one aspect of the invention, a method for managing persistence data for installed persistent objects involves marshaling a persistent object attribute value into a marshal buffer to provide an encoded persistent object attribute value, updating the persistent object attribute value to provide an updated persistent object attribute value, unmarshaling the updated persistent object attribute value from the marshal buffer to provide a decoded updated persistent object attribute value, and writing the decoded updated persistent object attribute value to the data store. In another aspect of the invention, a method for writing decoded updated persistent object attribute values to the data store includes extracting an index of persistent object attributes stored in the data structure, finding the location of the persistent object attribute in the data base, adding the persistent object attribute to the data store if the persistent object attribute cannot be found in the index, and writing the persistent object attribute value to the data store at the location corresponding to the persistent object attribute.

35 Claims, 21 Drawing Sheets

METHOD AND APPARATUS FOR STORING PERSISTENT OBJECTS ON A DISTRIBUTED OBJECT NETWORK USING A MARSHALING FRAMEWORK

BACKGROUND OF THE INVENTION

1. Field of Invention

The present invention relates to the fields of distributed object computing systems, client-server computing, and object-oriented programming. More particularly, the present invention relates to methods and devices for storing data for distributed objects that are persistent objects in a distributed object system.

2. Description of Prior Art

Object oriented programming methodologies have received increasing attention over the past several years in response to the growing tendency for software developed using traditional programming methods to be delivered late and over budget. This stems from the fact that traditional programming techniques that emphasize procedural models and "linear" code tend to be difficult to design and maintain in many circumstances. Generally, large programs created using traditional methods are "brittle". That is, even small changes can effect numerous elements of the programming code. Thus, minor changes made to the software in response to user demands can require major redesign and rewriting of the entire program.

Object oriented programming strategies tend to avoid these problems because object methodologies focus on manipulating data rather than procedures, thus providing the programmer with a more intuitive approach to modeling real world problems. In addition, objects encapsulate related data and procedures so as to hide that information from the remainder of the program by allowing access to the data and procedures only through the object's interface. Hence, changes to the data and/or procedures of the object are relatively isolated from the remainder of the program. This provides code that is more easily maintained as compared to code written using traditional methods, since changes to an object's code do not affect the code in the other objects. In addition, the inherent modular nature of objects allows individual objects and interfaces to be reused in different programs. Thus, programmers can develop libraries of "tried and true" objects and interfaces that can be used again in different applications. This increases software reliability while decreasing development time, as reliable programming code may be used repeatedly.

A more recent advance in the field of object oriented methodologies has been the implementation of distributed object operating environments over computers interconnected by a computer network. As used herein, the term "distributed object" or "object" refers to an encapsulated package of code and data that can be manipulated by operations through an interface. Thus, distributed objects will be seen by those skilled in the art of object oriented programming (OOP) as including the basic properties that define traditional programming objects. However, distributed objects differ from traditional programming objects by the inclusion of two important features. First, distributed objects are multilingual. That is, the interfaces of distributed objects are defined using an Interface Definition Language (IDL) that can be mapped to a variety of different programming languages. One such interface definition language is Object Management Group's IDL. Second, distributed objects are location-independent, i.e., distributed objects can be located anywhere in a network. This contrasts sharply with traditional programming objects which typically exist in a single address space.

Elaborating further on the distributed object operating environment, distributed objects can be object clients or object servers, depending upon whether they are sending requests to other objects or replying to requests from clients. In a distributed object operating environment, requests and replies are made through an Object Request Broker (ORB) that is aware of the locations and status of the objects. One architecture which is suitable for implementing such an ORB is provided by the Common Object Request Broker Architecture (CORBA) specification. The CORBA specification was developed by the Object Management Group (OMG) to define the distributed computing environment world in terms of objects in a distributed client-server environment, where server objects are capable of providing services to clients requesting the service.

When a client calls a target object, certain procedures must be performed to ensure that the target object can perform the requested service. These procedures include identifying and locating the target object, starting the server process under which the target object resides (if necessary), activating the target object (if necessary), and, finally, establishing a connection with the target object and passing the call. The ORB together with an Object Adapter (OA) is responsible for working with the client and the target object to perform these services.

From the perspective of the distributed object life cycle, objects fall into one of two categories: transient or persistent. When discussing the transient or persistent nature of an object, what is being referred to is the transient or persistent nature of the object's state. As will be well familiar to those skilled in the art of object oriented programming (OOP), an object may be described by two components: executable code and state. Executable code is essentially the instructions by which the object operates; it defines the "behavior" of the object. State is simply the remaining portion of the object which is not code such as data defining the object's current operation parameters.

Transient objects typically have a short life span and are bound to a single host computer process. That is, when a host computer process ceases, all transient objects residing in the host computer process cease. Therefore there is no continuity of identity, or state, of a transient object from one process to another. In other words, a transient object is always launched in a state defined by a given set of initialization parameters. In addition, because transient objects are bound to a single process, they inherently cannot change their location. Hence transient objects could also be referred to as "immobile" objects, as their addresses may never change. A programmer whose object kinds include only transient objects is limited in preserving the object state from instance to instance.

In contrast, persistent objects are not bound to a single process and their address and memory location may change over time (e.g., they may have many "life" cycles). With a persistent object, there is a continuity of identity, and state, from one process to another. In brief, persistent objects are objects whose state can outlive the life of a specific instance of the object. As will be appreciated, persistent objects may provide many advantages to the object developer.

The process of storing, or writing, an object attribute for a persistent object to a data store is the process of storing the state of the object attribute. The state of the object attribute is stored in a data store so that calls to retrieve the object attribute will result in the retrieval of the state of the object attribute which is stored, and not the "default" state of the object attribute. In other words, persistently writing and retrieving object attributes which are stored in a data store refers to the writing and retrieving of the most current state associated with the object attributes.

In one approach for providing persistent objects, the quality of "persistence" for objects has been introduced into existing object programming languages. In one approach, an extension to the existing programming language provides an interface to the functionality of a database into which is written the state data comprising the "persistent" qualities of a persistent object. For example, a compiler for an extended language using this approach might accept a specialized set of commands geared for use with a database. The most common type of database used with these methods is a relational database. However, as relational databases were not designed for storing data in a format in which object state is typically described, this may introduce its own set of dilemmas. Object oriented databases are available, but objects created by object oriented databases are not CORBA objects and so cannot take advantage of the functionalities and services provided by the CORBA guidelines. In addition, the retrieval of persistence data for a persistent object using current methodologies is slow, thus deteriorating system performance.

In conventional Interface Definition Language (IDL) interfaces, persistent data objects are stored in databases, which typically reside on a disk or the like, that may be described by a subset of IDL, namely a Database Description Language (DDL). The process of reading directly from and writing directly to databases on a disk each time a persistent object is to be used tends to be inefficient. In general, the process of reading from and writing to databases which are stored on a disk is slow. Further, persistent storage, or database, managers are typically used to search through databases to find a persistent object suitable for a process. The use of database managers often proves to be slow. It would therefore be advantageous to implement a method and apparatus which will implement persistence data storage such that persistent objects may be readily created and accessed at any time while a process is running on the distributed object system.

SUMMARY OF THE INVENTION

To achieve the foregoing and other objects and in accordance with the purpose of the present invention, data structures, methods and devices for implementing persistence data storages such that persistent objects may be efficiently created and accessed in a distributed client/server computing system are disclosed.

In one aspect of the invention, a method for managing persistence data for installed persistent objects involves marshaling a persistent object attribute value into a marshal buffer to provide an encoded persistent object attribute value, updating the persistent object attribute value to provide an updated persistent object attribute value, unmarshaling the updated persistent object attribute value from the marshal buffer to provide a decoded updated persistent object attribute value, and writing the decoded updated persistent object attribute value to the data store. In one embodiment, the method includes retrieving the persistent object attribute value from the persistent object prior to the step of marshaling the persistent object attribute value into the marshal buffer. In another embodiment, the method includes opening the data store, extracting from the data store an index of persistent object attributes contained in the data store, searching the index of persistent object attributes contained in the data store to determine the location of the persistent object attribute in the data store, and returning the persistent object attribute value corresponding to the persistent object attribute.

In another aspect of the invention, a method for writing decoded updated persistent object attribute values to the data store includes extracting an index of persistent object attributes stored in the data structure, finding the location of the persistent object attribute in the data base, adding the persistent object attribute to the data store if the persistent object attribute cannot be found in the index, and writing the persistent object attribute value to the data store at the location corresponding to the persistent object attribute.

In still another aspect of the invention, a method for managing persistence data for the installed persistent objects on a distributed object system includes invoking a method on the distributed object system, the method being associated with a persistent object attribute having a persistent object attribute value and a persistent object attribute name, marshaling the persistent object attribute value into a marshal buffer to provide thereby an encoded persistent object attribute value, updating the persistent object attribute value to provide an updated persistent object attribute value, unmarshaling the updated persistent object attribute value from the marshal buffer to provide a decoded updated persistent object attribute value, and writing the decoded updated persistent object attribute value to the data store. In one embodiment, the method includes retrieving the persistent object attribute value from the persistent object prior to the step of marshaling the persistent object attribute value into the marshal buffer. In another embodiment, writing the decoded updated persistent object attribute value to the data store includes extracting an index of persistent object attributes stored in the data store, finding the location of the persistent object attribute in the data base using the persistent object attribute name and the index, adding the persistent object attribute to the data store if the persistent object attribute cannot be found in the index, writing the persistent object attribute name to the data store at the location corresponding to the persistent object attribute, and writing the persistent object attribute value to the data store at the location corresponding to the persistent object attribute.

These and other features and advantages of the invention will be presented in more detail in the following detailed description of the invention and in the associated figures.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The detailed description of the invention is divided into two sections; the first section is a description of distributed object systems in general. The second section is a description of one embodiment of a framework for storing and retrieving persistence data for persistent objects installed on a distributed object system in accordance with the present invention.

1. Background of Distributed Object Systems

Figure 1A:
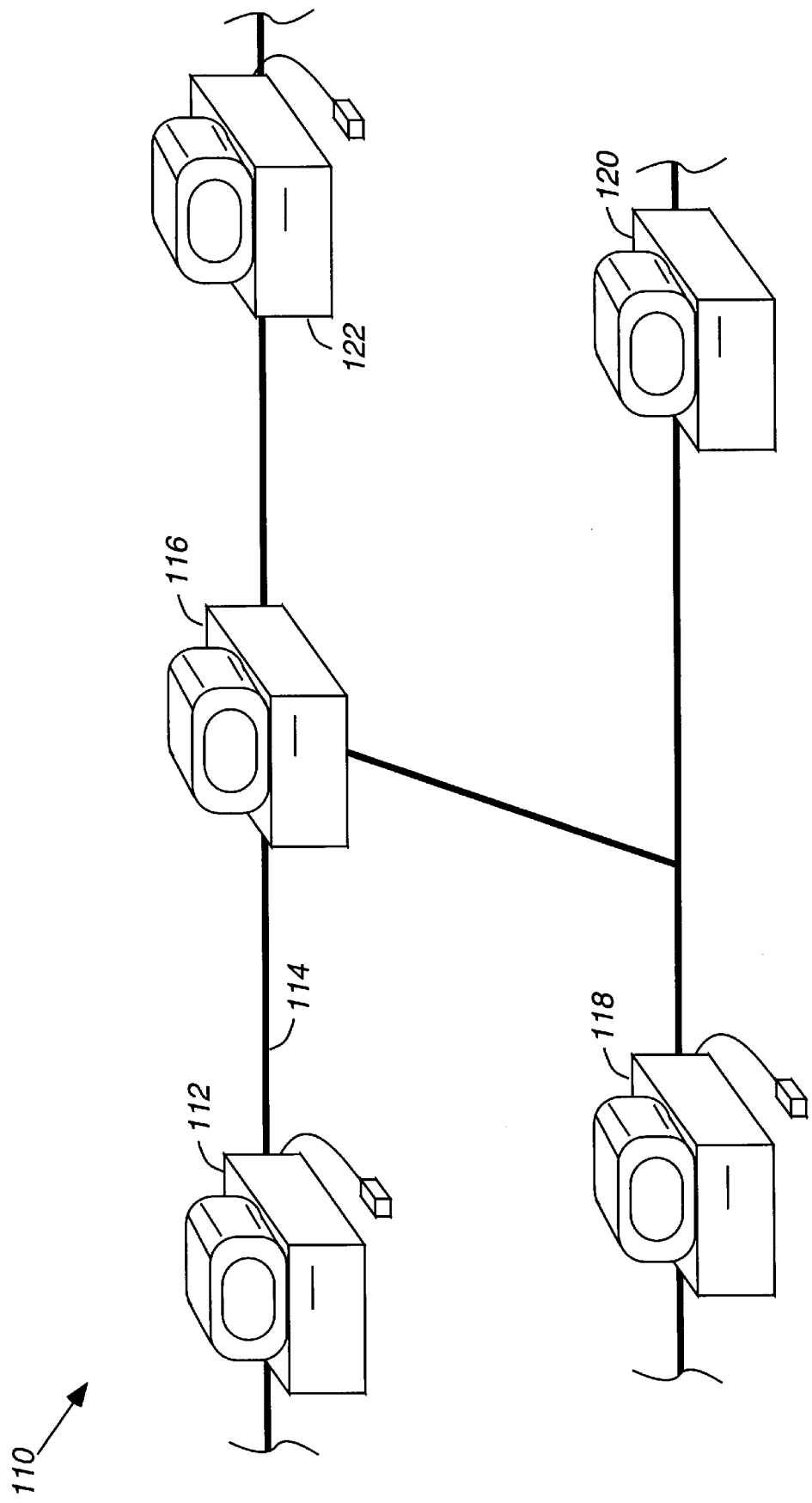
FIG. 1A is a pictorial illustration of a computer network suitable for implementing a distributed object system in accordance with the present invention.

The present invention will now be described in detail with reference to embodiments thereof as illustrated in the accompanying drawings. In one embodiment of the present invention, distributed objects and computer processes are resident on one or more computers linked together by a network. The network may take any suitable form. By way of example, a representative network arrangement 110 is illustrated in FIG. 1A. Network arrangement 110 includes a first computer 112 which is coupled to a transmission line 114. Network arrangement 110 further includes a server, router or the like 116 in addition to other computers 118, 120, and 122 such that data and instructions may be passed among the networked computers. The design, construction, and implementation of computer networks will be familiar to those of skill in the art.

Figure 1B:
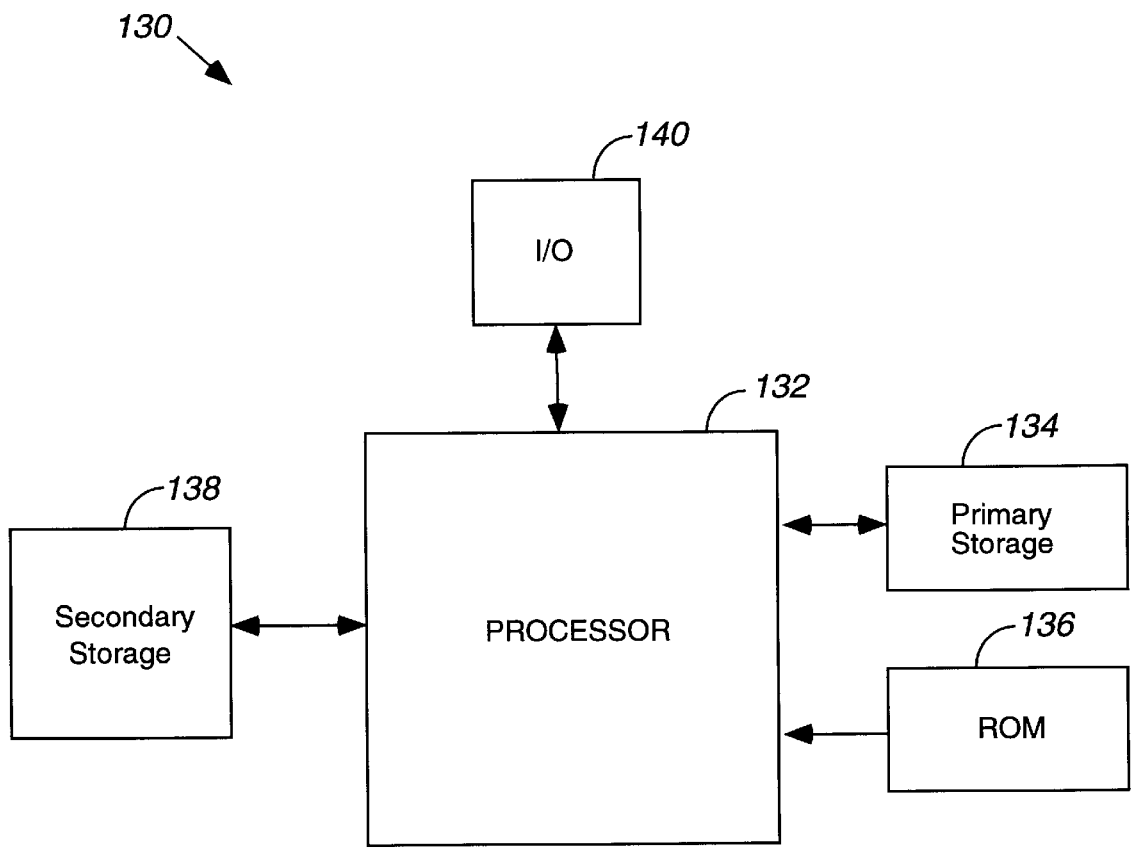
FIG. 1B is a diagrammatic illustration of the major components of a computer as shown in FIG. 1A.

A representative computer 130 suitable for use as computers 112, 118, 120, and/or 122 of FIG. 1A is illustrated schematically in FIG. 1B. Computer 130 includes a secondary storage device 132, (typically a central processing unit, or CPU) which is coupled bi-directionally with a primary storage device 134 (typically a random access memory, or RAM) and uni-directionally with a primary storage device 136 (typically a read only memory, or ROM). Typically, RAM 134 is used as a "scratch pad" memory and includes programming instructions and data, including distributed objects and their associated code and state, for processes currently operating on CPU 132. ROM 136 typically includes basic operating instructions, data, and objects used by computer 130 to perform its functions. In addition, a mass storage device 138, such as a hard disk, CD ROM, magneto-optical (floptical) drive, tape drive or the like, is coupled bi-directionally with CPU 132. Mass storage device 38 generally includes additional programming instructions, data, and objects that typically are not in active use by CPU 132, although the address space may be accessed by CPU 132, e.g., for virtual memory or the like. Each of the above described computers optionally includes an input/output source 140 that typically includes input media such as a keyboard, pointer devices (e.g., a mouse or stylus) and/or network connections. Additional mass storage devices (not shown) may also be connected to CPU 132 through a network connection. It will be appreciated by those skilled in the art that the above described hardware and software elements, as well as the networking devices, are of standard design and construction, and will be well familiar to those skilled in the art.

The present invention may be practiced within the context of any suitable distributed object system, including those defined under CORBA or any other suitable specification. However, for purposes of illustration, the present invention will be described primarily within the context of an Object Request Broker (ORB) implemented under the CORBA specification from the Object Management Group (OMG), Revision 2.0, dated July 1995, which is incorporated herein by reference for all purposes.

Figure 1C:
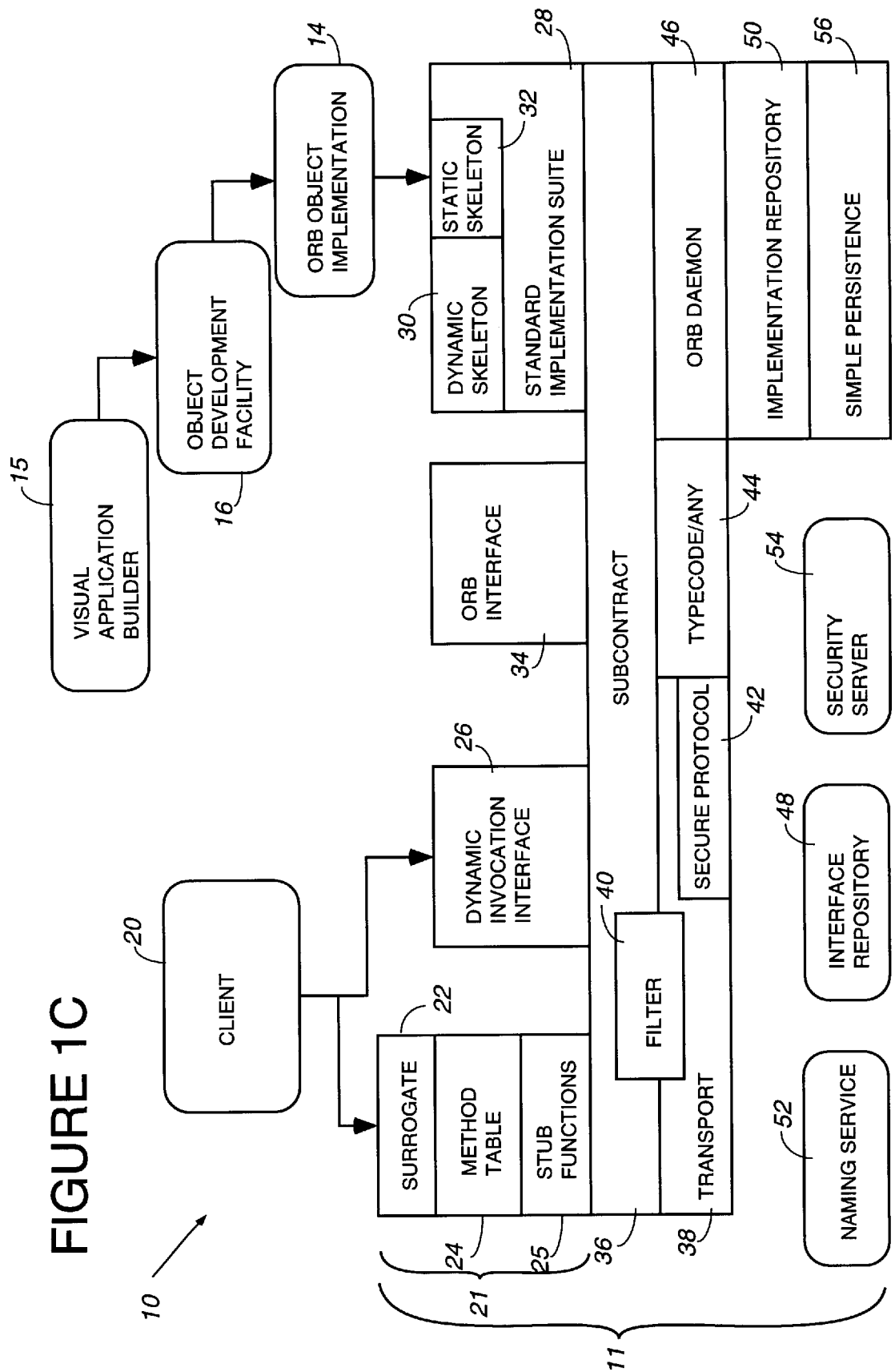
FIG. 1C is a symbolic overview of a distributed object system in accordance with the present invention.

FIG. 1C diagrammatically illustrates the overall architecture of a representative distributed object system suitable for implementing the present invention. A distributed object system 10 typically includes an Object Request Broker (ORB) 11. ORB 11 provides all of the location and transport mechanisms and facilities necessary to deliver a call from a client to a servant (target object) and to return a response to the client. The client and servant may be located in the same process, in different processes on the same machine, or on completely different machines. For the purposes of this discussion, client 20 may be any code that invokes an operation on a distributed object and thus may or may not take the form of a distributed object or a process. A distributed object may have a wide variety of representations. By way of example, an object may be a C++ object that has been provided by an application developer. Alternatively, an implementation for an object may be developed using development tools effective for generating distributed objects.

Client 20 communicates with a servant by way of a stub 21, a subcontract layer 36, possibly a filter 40, and a transport layer 38. Stub 21 includes a surrogate 22, a method table 24 and stub functions 25. Client 20 communicates initially with surrogate 22 that appears to the client as the server object. Alternatively, client 20 may communicate directly with the server object through a dynamic invocation interface (DII) 26 instead of through surrogate 22, method table 24 and stub functions 25. Dynamic invocation interface 26 is used to enable clients to construct dynamic requests. After the client has initiated a call, the call is processed using a method table dispatch mechanism 24. Such a technique is disclosed in U.S. patent application Ser. No. 08/307,929 and is hereby incorporated by reference.

Subcontract layer 36 provides the functionality required by an object in order to utilize subcontracts to implement various services (or features or object mechanisms) named by a particular subcontract, as described in greater detail in U.S. patent application Ser. No. 08/554,794, filed Nov. 7, 1995 which is incorporated herein by reference. A subcontract identifies a quality of service provided by the distributed object system that may be utilized by an individual object. For example, a subcontract may identify that the feature of security is to be used for a particular object.

Filter 40, if being used, may perform a variety of tasks, such as compression, encryption, tracing, or debugging, that are to be applied to communications to and from an object. Transport layer 38 operates to marshal, unmarshal and physically transport information to and from a servant that typically does not share the same process as a client.

A standard implementation suite 28 (or object adapter) represents a set of subcontracts that interact with ORB objects 14 in identical ways, as for example object key management. It should be noted that a subcontract may belong to multiple implementation suites. Also, implementation suites may utilize different subcontracts. A skeleton, that may take the form of either static skeleton 32 or dynamic skeleton 30, is used to transform requests into a format required by a servant object. Thus, skeletons 30 and 32 call an appropriate servant object. Static skeleton 32 is used to call interface-specific object implementations 14, while dynamic skeleton 30 is used generically when interface-specific objects are not available. An ORB interface 34 is the interface that goes directly to the ORB that is the same for all ORBs and does not depend upon an object's interface or object adapter.

An ORB daemon 46 is responsible for ensuring that object servers are active when invoked by clients. A technique for starting object servers is disclosed in U.S. patent application Ser. No. 08/408,645 which is hereby incorporated by reference for all purposes.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between process on the same machine. The security server 54 is a security administration server that secures the services that are used between processes on different computers.

Typecode/Any module 44 implements "Typecode" and "Any" objects. Typecode describes an Interface Definition Language (IDL) data type, allowing type descriptions to be transmitted between clients and servers. An instance of an IDL data type may be encapsulated by an Any object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. A naming service 52 is used to name ORB objects. A client may use naming service 52 to find a desired object by name. Naming service 52 returns an object reference, that in turn may be used to send requests to that object. An Interface Repository 48 (IFR) knows about all interfaces for all objects within the distributed object system.

2. Description of a Persistent Data Storage Mechanism In Accordance With the Present Invention From the perspective of the distributed object life cycle, distributed objects can have the quality of being transient or persistent. When discussing the transient or persistent nature of an object, what is being referred to is the transient or persistent nature of the object's state. As discussed above, state is simply the portion of the object, such as data, which is not executable code. Thus, as used herein, the terms "persistence" and "persistence data" refer to that data necessary to define the state of a persistent object. Persistence data comprises a persistent object attribute having a persistent object attribute value.

The persistence data itself may comprise objects, referred to herein as "persistence data objects." Persistence data objects are stored in data stores, or databases, which may be described by a suitable interface definition language, such as the Database Description Language (DDL) which is a subset of the well-known Interface Definition Language (IDL). As used herein, a "data store" is a database which contains information pertaining to persistent objects and attributes associated with such objects. More specifically, a data store contains a list, or sequence, of persistence data and/or persistence data objects, each of which has associated attributes that may both have a name and a value. These data stores are typically stored on disks or similar storage devices that are considered permanent relative to storage in temporary memory such as RAM. The process of reading from and writing persistence data to data stores using current methodologies often proves to be inefficient, thus degrading system performance.

In one aspect, the present invention provides a framework in which persistence objects are marshaled, i.e., encapsulated, so that object attributes can be retrieved and written to a persistent storage mechanism (i.e., a data store) efficiently to thereby reduce the performance penalty associated with reading and writing attributes to a file stored on a permanent storage medium such as a disk. The use of such a framework also provides a smooth integration of object persistence capabilities with distributed objects. By way of example, the framework provided by the present invention allows for the same mapping to be used for all IDL data types, regardless of whether the data type is specific to a transient distributed object or a persistent distributed object. Hence, a common code base may be developed for describing a variety of objects, thereby enhancing the overall performance of a distributed object system and increasing reliability through reuse of code.

Figure 2:
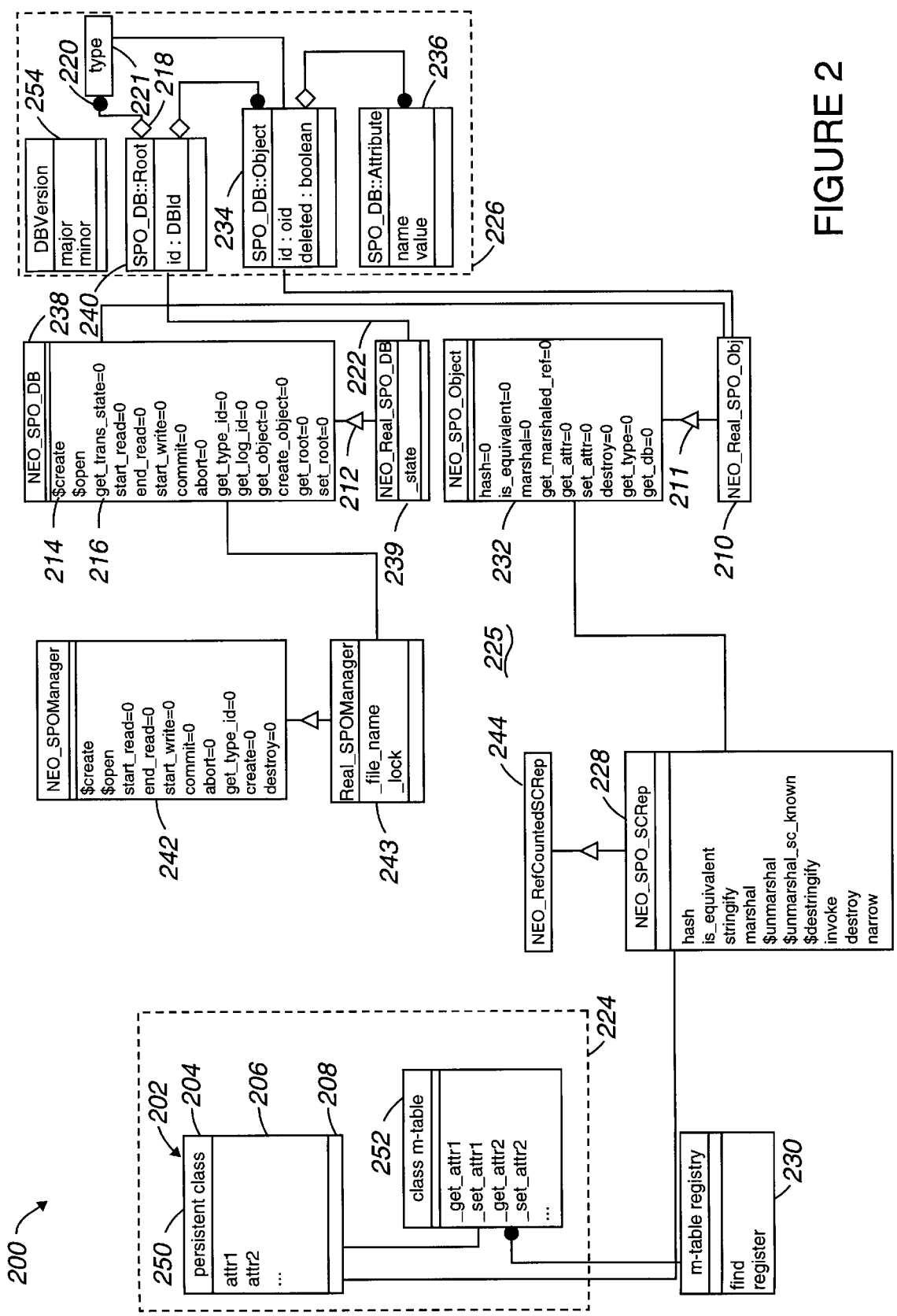
FIG. 2 is a diagrammatic representation of an Object Modeling Technique (OMT) class diagram in accordance with one embodiment of the present invention.

FIG. 2 is a diagrammatic representation of an Object Modeling Technique (OMT) class diagram in accordance with one embodiment of the present invention. OMT class diagram 200 is a representation of an overall framework mechanism which may be used to support persistent objects. By way of background, a class is a template from which objects can be created. The class specifies the behavior and attributes common to all instances of the class. The mechanism by which new classes are defined from existing classes is "inheritance." "Inheritance" is well-known as a mechanism by which reusability is facilitated. "Subclasses" of a class inherit operations of their parent class. As will be appreciated by those skilled in the art of object oriented programming, when a new instance of a class is created, the memory for the instance variables is allocated automatically.

FIG. 2 illustrates various related data structures 202 used to define persistent objects. Class 202 includes a class name 204, associated attributes 206, and associated methods 208. Each unadorned line between classes, as for example line 222, represents a one-to-one relationship between the connected two data structures. A circle 220 at one end of a line and a diamond at the other of a line indicates a many-to-one relationship between the related classes. By way of example, the relationship between the class "type" 221 and an instance of a SPO_DB::Root ("Simple Persistent Object_ Data Base::Root") class 240 is a many-to-one relationship. A triangle, such as triangle 212, on a line indicates an inheritance relationship between the classes wherein the class facing the base of the triangle inherits from the class facing the vertex of the triangle. Dollar sign symbols which appear in front of certain method names (e.g., the method "$create" 214 of NEO_SPO_DB class 238) indicate static or class methods, i.e., methods having no associated object state at the time of execution. Methods which are shown as being set equal to zero, as for example the get_trans_state method 216, are abstract methods which are not defined in the containing class, but are defined in a class that inherits from the present state. It should be appreciated that while instances of classes containing abstract methods typically do not exist, an instance of a class derived from an abstract class may be thought of as an instance of the abstract class.

In one embodiment, the classes comprising OMT class diagram 200 includes three groups: classes defining persistent objects and methods for implementing persistence 224; classes defining a persistence data storage mechanism 225; and classes defining a data store 226 into which persistence is written and retrieved. Persistent object class 224 includes a persistence class 250 which defines persistence data comprising attributes. Persistence class 250 is related to method table (m-table) class 252 which defines methods that can be invoked on instances of class 250 to perform operations to write and retrieve persistence data from data store 226 as describe further herein. Persistence data storage mechanism 225 includes a NEO_SPO_DB class 238, a NEO_Real_ SPO_DB class 239, a NEO_SPO_Object class 232, a NEO_Real_SPO_Obj class 210, a NEO_SPOManager class 242, a Real_SPOManager class 243, a NEO_SPO_ SCRep class 228, and a NEO_RefCountedSCRep class 228. These classes define operations which comprise a persistence data storage mechanism through which persistence data from instances of persistence class 250 is written and/or retrieved from data store 226.

According to the illustrated embodiment, an instance of NEO_SPO_DB class 238 has static create and open methods which may be used to create and open data stores, or databases. Although instances of NEO_Real_SPO_DB class 239 inherit from instances of NEO_SPO_DB class 238, the static methods are not overwritten by inheritance. The static create and open functions are used prior to any of the other methods associated with NEO_SPO_DB class 238. NEO_SPO_DB class 238 represents a database manager which manages the reading, writing, opening, and closing of databases. An instance of NEO_SPO_DB class 238 is associated with an instance of NEO_SPO_Object class 232 which, in turn, is associated with an instance of NEO_SPO_SCRep class 228, which is a subcontract representation with methods which support object invocation. NEO_SPO_Object class 232 represents a database object which provides the actual functionality of updating object representations held in memory. Get attribute, i.e., get_attr, methods and set attribute, i.e., set_attr, methods associated with an instance of NEO_SPO_Object class 232 are used in the invocation of persistent objects as will be described below with respect to FIG. 3.

In one embodiment, the static create and open methods associated with an instance of NEO_SPO_Manager class 242 are used to create and open data stores. If multiple back-ends are plugged into persistence data storage mechanism 225, however, the static create and open methods associated with an instance of NEO_SPO_Manager class 242 are further used to select the appropriate back end to suit a particular purpose. NEO_SPO_Manager class 242 provides an interface which may be used to control concurrency, create objects, destroy objects, and save changes made to objects on disk. In general, NEO_SPO_ Manager class 242 serves as a simple persistent object adapter.

Data store 226 is a data structure into which persistent data is written into memory. Data store 226 typically includes, but is not limited to, a DBVersion class 254, an SPO_DB::Object class 234, an SPO_DB::Attribute 236, an SPO_DB::Root 240, and types class 221. SPO_ DB::Attributes 236 are attributes which are associated with SPO_DB::Objects 234, which are associated with an SPO_ DB::Root 240, which is a representation of a single data store. In one embodiment, data store 226 is decoupled from persistence data storage mechanism 225 to define thereby a "pluggable back-end" that may be readily changed without affecting persistence data storage mechanism 225. The data structure for a data store may vary widely depending upon the particular framework with which the data store is associated. One representation of the data structure of a data store will be described below with reference to FIG. 5.

Figure 3:
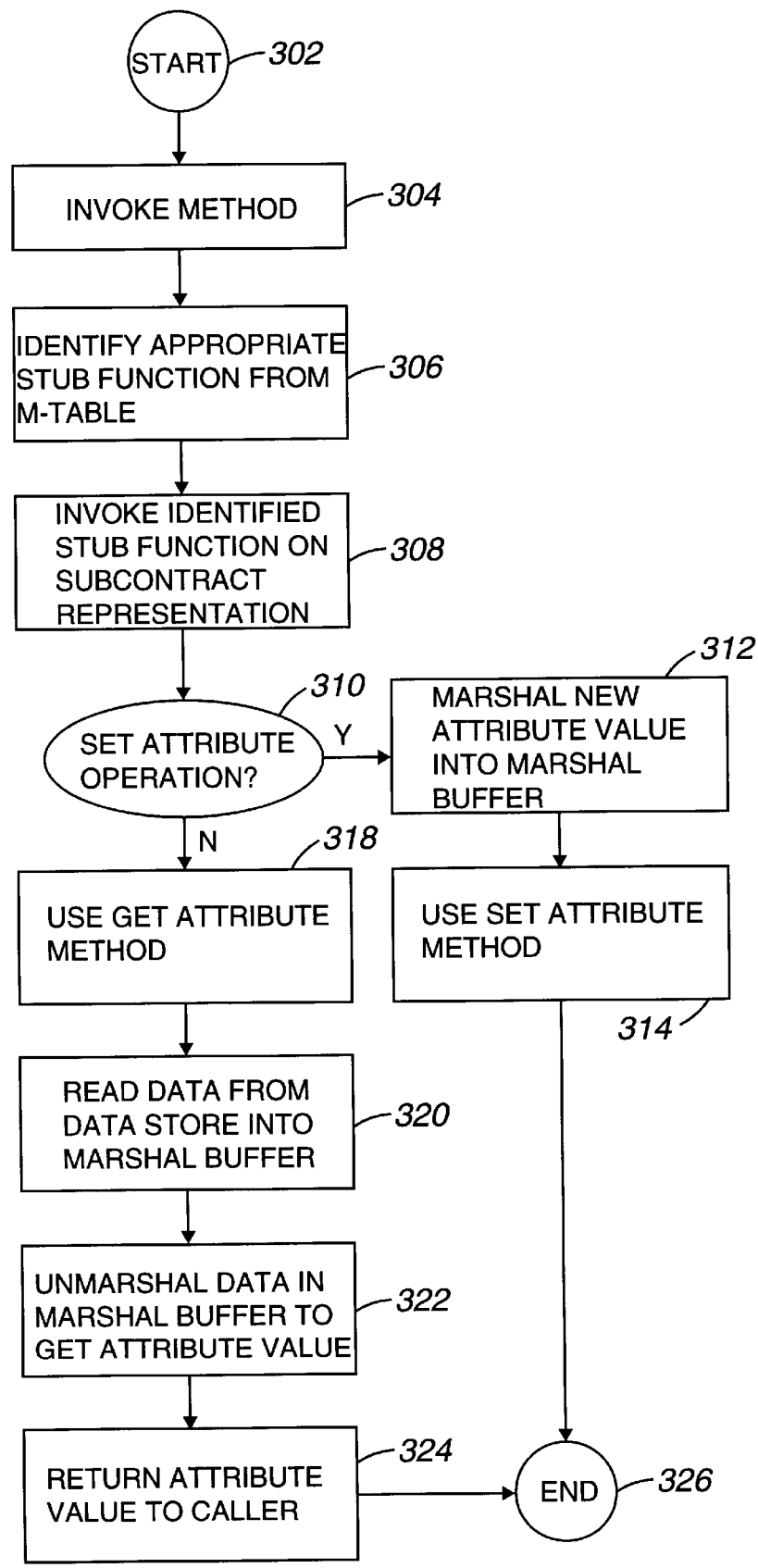
FIG. 3 is a process flow diagram which illustrates the steps associated with reading and writing data in a persistent object framework in accordance with one embodiment of the present invention.

FIG. 3 is a process flow diagram which illustrates the steps associated with reading and writing persistence data to a data store in accordance with one embodiment of the present invention. Process flow begins at step 302 when a call is made either for setting (writing) or getting (creating) an attribute. An "attribute," as used herein, may be an object specified in an Interface Definition Language (IDL) which has a value, or an attribute itself may be a value. If the attribute is an object, data store persistence data is also referred to here as an "attribute." In one embodiment, this call is made with an object reference.

In the described embodiment, an object reference may be a fat pointer, which is a mechanism for representing an object reference that is useful within many frameworks, as for example within the CORBA framework. A fat pointer may be thought of as a structure which contains two "normal" pointers. The first pointer in a fat pointer is a representation pointer that points to a client representation, while the second pointer in a fat pointer is a pointer that points to a method table, or m-table, which is associated with the client representation. A client representation, also known as a subcontract representation in the described embodiment, is an object which has methods to support object invocation. In one embodiment, each client representation is associated with an m-table which is associated with stub functions that may be used to determine an appropriate dispatch method for use in the invocation of a called method using a fat pointer. The associated m-table may be either a local m-table or a remote, or standard, m-table. A standard m-table is associated with code which may be used for marshaling data and unmarshaling results. That is, a standard m-table has code which may be used to write data for persistent objects to a data store and code which may be used to retrieve data for persistent objects from a data store. In one embodiment, persistent objects are associated with a standard m-table.

In step 304, a method to perform an operation on the data store is invoked using an object reference. In the described embodiment, the method invoked will either be a method to set an attribute (a "set attribute" method) or a method to get an attribute (a "get attribute" method). In one embodiment, non-attribute methods are not supported, so a request containing a non-attribute method is treated as an error. Other embodiments are possible, including embodiments which use a standard m-table method for marshaling a request, and embodiments which use a local m-table method for performing an operation locally. In the latter embodiments, the object representation may contain a "mixed" m-table, or an m-table which contains standard m-table methods for attributes and local m-table attributes for methods.

After the method is invoked in step 304, the appropriate stub function for use in the invocation of the method is identified using the appropriate m-table in step 306. Then, in step 308, the identified stub function is invoked on a subcontract, or, a subcontract representation, in part to identify the servant which is to be invoked. Once the identified stub function is invoked on the subcontract representation, a determination is made in step 310 regarding whether the method is a "set attribute" operation or a "get attribute" operation. If the determination is made that the operation is a set attribute operation, then the indication is that the object reference which was passed to the invoked method contains an attribute value, and process flow proceeds to step 312 where the attribute value is marshaled, or encoded, into a marshal buffer. Once the new attribute value is marshaled into a marshal buffer, a set attribute method is used to write the new attribute value to the data store. Referring back to OMT 200 of FIG. 2, the set attribute method is a method associated with an object which is an instance of the NEO_SPO_Object class 232 ("set_attr") and will be described below with reference to FIG. 4. After the set attribute method is used to write data to a data store, the process of writing data to the data store is completed at step 326.

If the determination in step 310 is that the operation is a get attribute operation, then process control proceeds to step 318 where a get attribute method is used to retrieve an attribute from the data store. Like the set attribute method mentioned above, the get attribute method, which has a method name beginning with "get_" followed by the name of the attribute, and associated with NEO_SPO_Object 232 in FIG. 2, is used to read data from the data store into a marshal buffer in step 320. The steps associated with reading data from the data store will be described below with reference to FIG. 7. In step 322, the data in the marshal buffer is unmarshaled in order to obtain the attribute value requested by the caller, or the object reference associated with the called method. After the attribute value is obtained, the attribute value is returned to the caller in step 324. Then, the process of reading data from a data store in a persistent object framework is completed at step 326.

Figure 4:
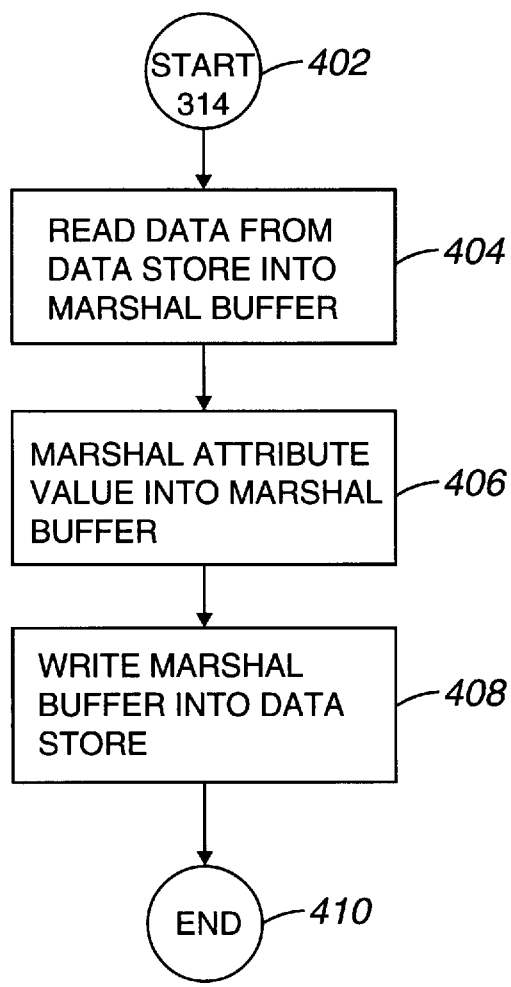
FIG. 4 is a process flow diagram which illustrates step 314 of FIG. 3 in accordance with one embodiment of the present invention.

Referring next to FIG. 4, a process of using a set attribute method to set a new attribute value (step 314 of FIG. 3) in accordance with one embodiment of the present invention will be described. Process flow 400 begins at step 402 when a set attribute method is called. In step 404, persistence data (i.e., the attribute value) is read from the data store into a marshal buffer. In one embodiment, the persistence data read from the data store is already in a marshaled form, e.g. a binary stream of octets. One method which may be used to read data from a data store will be described below with reference to FIG. 7. After the persistence data is read from the data store, the attribute value is marshaled into the marshal buffer in step 406. In step 408, the marshal buffer containing the attribute value is written into the data store. A method which may be used to write data into a data store will be described below with respect to FIG. 6. After the marshal buffer is written into the data store, the process of using a set attribute method is completed at step 410.

Figure 5:
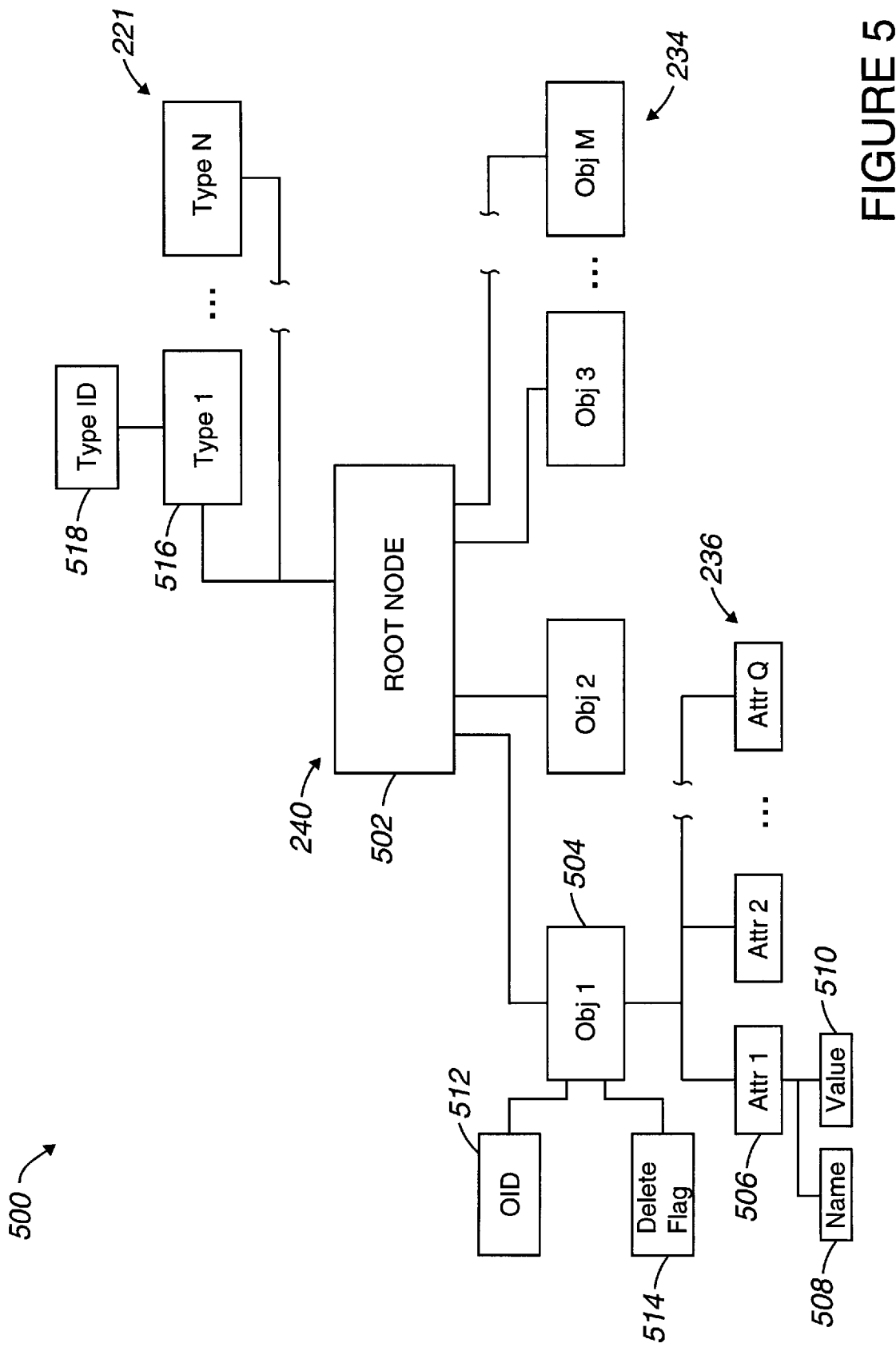
FIG. 5 is a diagrammatic representation of data store structure used in a persistent object framework in accordance with one embodiment of the present invention.

FIG. 5 is a diagrammatic representation of a data structure 500 for a data store in accordance with one embodiment of the present invention. FIG. 5 illustrates a representation of instances of some of the classes as described above with reference to FIG. 2. More specifically, FIG. 5 illustrates a representation of the classes contained in group 226 of FIG. 2. Data structure 500 includes a root node 502 which identifies the version and characteristics associated with the data store. That is, root node 502 is an identifier for the data store. Referring back to FIG. 2, root node 502 is an instance of SPO_DB::Root class 240 and has at least one associated data store object 504 which descends therefrom. Data store objects 504 are instances of SPO_DB::Object class 234, as for example "Obj 1." Each data store object 504 includes attributes 506 which are instances of SPO_DB::Attribute class 236, as for example "Attr 1." Each attribute 506 is associated with a name 508 and a value 510, and represents persistence data. Name 508, which serves as a unique identifier for attribute 506 of object 504, and value 510, are sequences of octets according to one embodiment of the present invention.

In one embodiment, each object 504 is also associated with an object identifier (OID) 512 and a delete flag 514. OID 512, which uniquely identifies object 504 with which it is associated, will be described below with respect to FIG. 10. Delete flag 514, also referred to as a deleted flag, identifies whether the deletion of the object with which it is associated has created an available space in which another object may be inserted. Other methods to make such identifications will be apparent to those of skill in the distributed object programming arts.

In one embodiment, root node 502 also has an associated list of types 516, each type 516 having a unique type identifier (ID) 518 which is associated with an interface identifier. Each type 516 may be associated with a corresponding object 504. Type 516 is equivalent to type 221 as shown in FIG. 2. According to this particular embodiment, each object 504 corresponds to one type 516, while each type 516 corresponds to one or more objects 504. Type ID 518 may be used in an "interface repository," or listing of available interfaces, to identify an interface suitable for a particular invocation. With reference to FIG. 2, type ID 518 may be used in m-table registry 230 to identify the standard m-table for use with the method being invoked.

Figure 6:
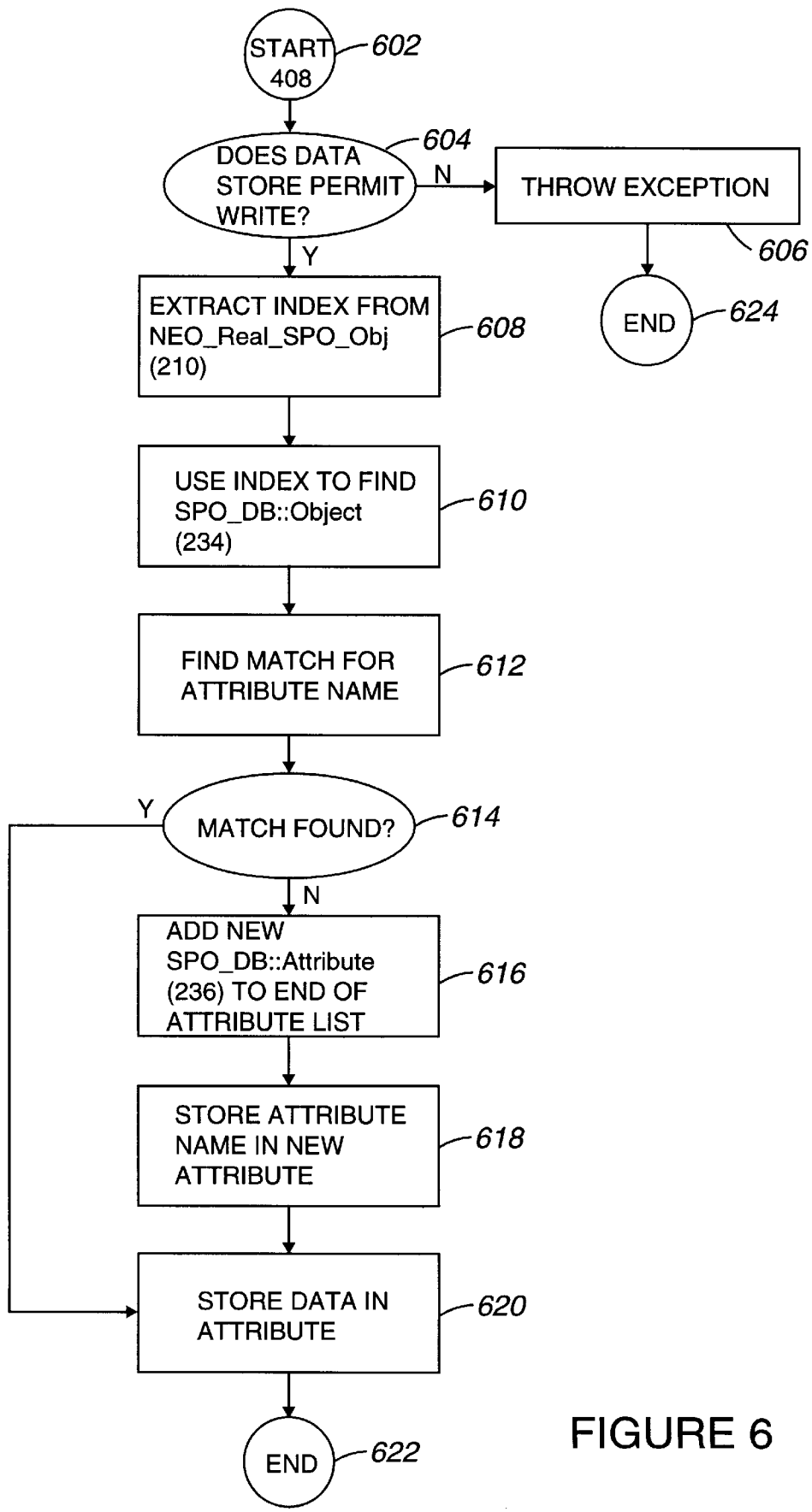
FIG. 6 is a process flow diagram which illustrates step 408 of FIG. 4 in accordance with one embodiment of the present invention.

Referring next to FIG. 6, a method of writing data into a data store, i.e., step 408 of FIG. 4, in accordance with one embodiment of the present invention will be described. The process of writing data into a data store begins at step 602 and proceeds to step 604 which is the determination of whether the data store which is to be written to permits write operations. This determination involves the determination of whether some mechanism to prevent multiple read and write operations from occurring simultaneously is set to permit writing to the data store. In some embodiments, the determination of whether the data store permits write operations involves the determination of whether a write lock associated with the data store is set to enable the data store to be written to. If it is determined that the data store does not permit write operations, then an exception is thrown in step 606, and the process terminates at step 624.

If it is determined in step 604 that the data store permits write operations, then process control moves to step 608 where an index is extracted from a NEO_Real_SPO_Object, which is identified as NEO_Real_SPO_Obj 210 in FIG. 2. The particular NEO_Real_SPO_DB_Object from which the index is extracted is the internal instance of the NEO_Real_SPO_DB_Object class pointed to by the object reference, which will be described below with respect to FIG. 11. After the index is extracted, the extracted index is used to find the corresponding SPO_DB::Object in the data store in step 610. The SPO_DB::Object is identified as SPO_DB::Object 234 in FIG. 2. As the extracted index is usually an integer, a variety of searches, as for example searches using look-up tables and linear searches, may be used to find the appropriate SPO_DB::Object in the data store. After the SPO_DB::Object is found, the SPO_DB::Object is used in step 612 to find a match for the name of the attribute which is to be set. In other words, SPO_DB::Attributes associated with the corresponding SPO_DB::Object in the data store are searched to find a match for the name of the attribute, i.e., attribute name, that is being written to the data store. An SPO_DB::Attribute is identified in FIG. 2 as SPO_DB::Attribute 236, and, as described above with reference to FIG. 5, each object in the data store has associated attributes. As the attribute name is usually a string, or a sequence of octets, search methods which are typically used to find a match include linear search methods and binary search methods.

Once a search through existing attribute names in the data store is made, a determination is made in step 614 regarding whether a match was found which corresponds to the name of the attribute which is to be set. If a match for the attribute name was not found, process control proceeds to step 616 where a new SPO_DB::Attribute is added to the end of the attribute list. After the new SPO_DB::Attribute is added to the end of the attribute list in step 616, the attribute name is stored in the new attribute in step 618. Then, in step 620, the data which is to be written to the data store is stored in the new attribute.

If it is determined in step 614 that a match for the attribute name was found, then process control moves directly to step 620 where the contents of the marshal buffer, i.e., the attribute value contained in the marshal buffer as data, are stored in the attribute. In other words, data which is encapsulated in the marshal buffer is stored in the new attribute. Finally, the process of writing data encapsulated in a marshal buffer into a data store is completed in step 410.

Figure 7:
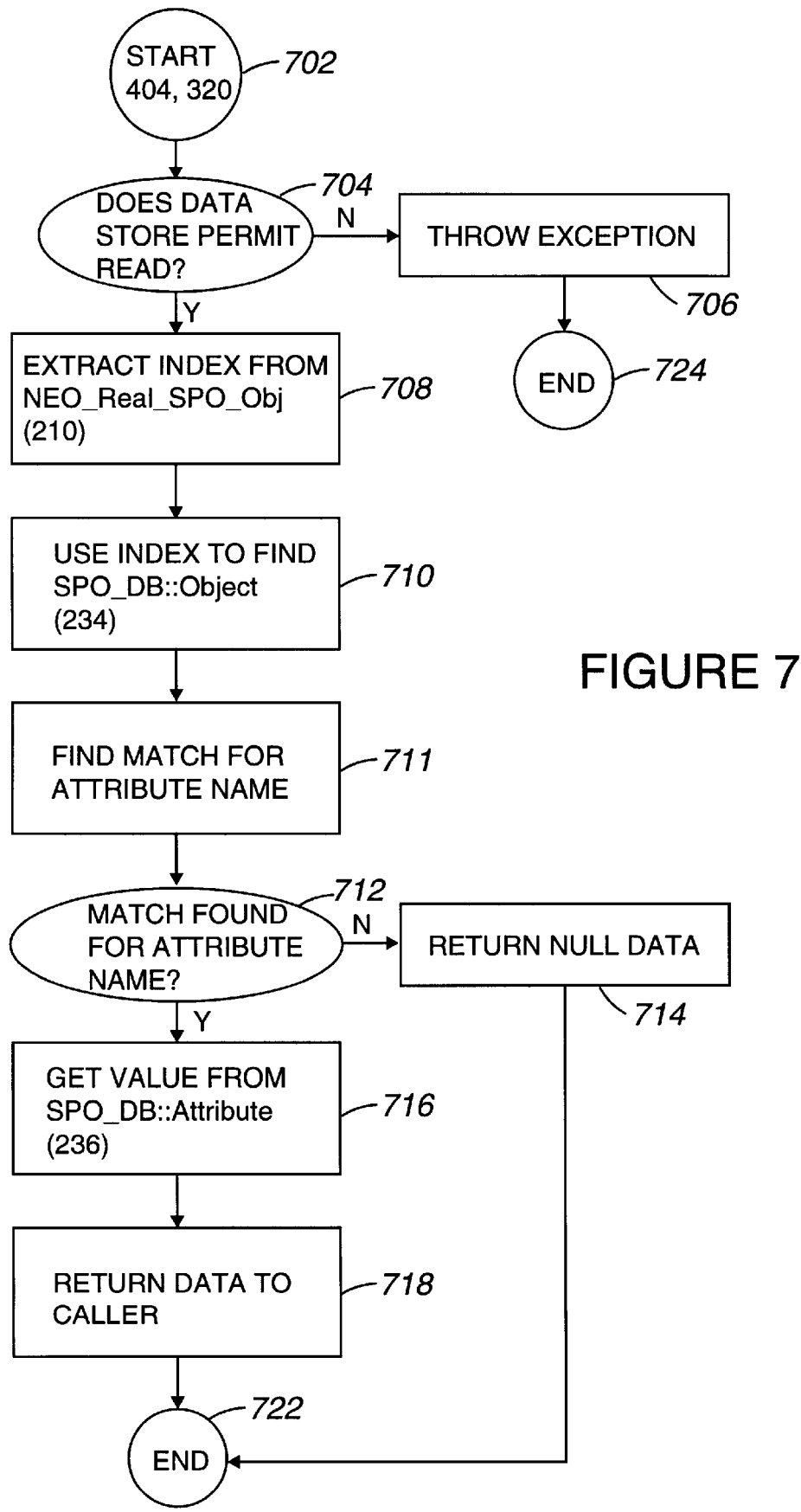
FIG. 7 is a process flow diagram which illustrates step 320 of FIG. 3 and step 404 of FIG. 4 in accordance with one embodiment of the present invention.

Referring next to FIG. 7, a method of reading data from a data store, i.e., step 320 of FIG. 3 and step 404 of FIG. 4, will be described in accordance with one embodiment of the present invention. The process of reading data from a data store into a marshal buffer begins at step 702. In step 704, a determination is made regarding whether the data store from which data is to be read permits reading. This determination includes, in one embodiment, determining whether there is a shared read lock associated with the data store which is set to enable reading from the data store. If the determination is that the read lock does not permit a read operation, then an exception is thrown in 706 which indicates that data may not be read from the data store. The process of reading data from a data store is terminated at step 724.

If it is determined in step 704 that the data store permits read operations, process control moves to step 708 where an index is extracted from a NEO_Real_SPO_Object, which is identified as NEO_Real_SPO_Obj 210 in FIG. 2. The index is extracted from the internal instance of the NEO_Real_SPO_Object class which is pointed to by the object reference, which is described below with respect to FIG. 11. After the index is extracted, the extracted index is used to find the corresponding SPO_DB::Object in step 710. The SPO_DB::Object is identified as SPO_DB::Object 234 in FIG. 2. As the extracted index is usually an integer, a variety of search methodologies, for example searches using look-up tables and linear searches, may be used to find the appropriate SPO_DB::Object. After the SPO_DB::Object is found, the SPO_DB::Object is used in step 711 to find a match for the name of the attribute which is to be read. In one embodiment, a linear search method is used to locate those SPO_DB::Attributes (Class 236 of FIG. 2) associated with the corresponding SPO_DB::Object to find a match for the name of the attribute, i.e., the attribute name, that is to be read from the data store. It should be appreciated that while other mechanisms, e.g., hashing and binary searches, may be used, a linear search may be the best choice for the common case in which objects have only a few attributes. As described above with reference to FIG. 5, each data store object has one or more associated attributes.

Once a search through existing attribute names in the data store is made, a determination is made in step 712 regarding whether a match was found which corresponds to the name of the attribute which is to be read. If a match for the attribute name was not found, then the attribute which is to be read is determined not to exist for the data store object identified in step 710. Process control then proceeds to step 714 where, according to one embodiment, null data is returned to the caller or requesting process in lieu of an exception. In some cases, null data may not indicate an error, as null data may simply signify that an attribute has not been set. After null data is returned to the caller, the process of reading data into a marshal buffer from a data store is considered to be completed at step 722.

If it is determined that a match was found for the attribute name in step 712, then the data corresponding to the value of the attribute is obtained from the appropriate SPO_DB::Attribute in step 716, which is the attribute having a name that matches the name of the attribute to be read. After the data corresponding to the value of the attribute is obtained from the SPO_DB::Attribute, the data is returned to the caller in step 718. The process of reading data into a marshal buffer from a data store is then completed at step 722.

In order to read attributes from, and write attributes to a data store, the data store must first be opened. In one embodiment, to open a data store, a file which contains information that relates to the data store is identified. As a process which is running on a distributed object system generally utilizes more than one data store, a file which is suitable for the particular attribute that is to be read from or written to the data store is first identified. As was described above with respect to the embodiment illustrated in FIG. 5, attributes are associated with objects which are each, in turn, associated with an object identifier. The object identifier contains information which identifies the data store and, therefore, the file to which the object and attributes associated with the object belong. Object identifiers will be described in more detail below with reference to FIG. 10. In one embodiment, the appropriate file used to open a particular data store is uniquely identified using the object identifier of the object associated with the attribute which is to be read from, or written to, the data store.

Figure 8:
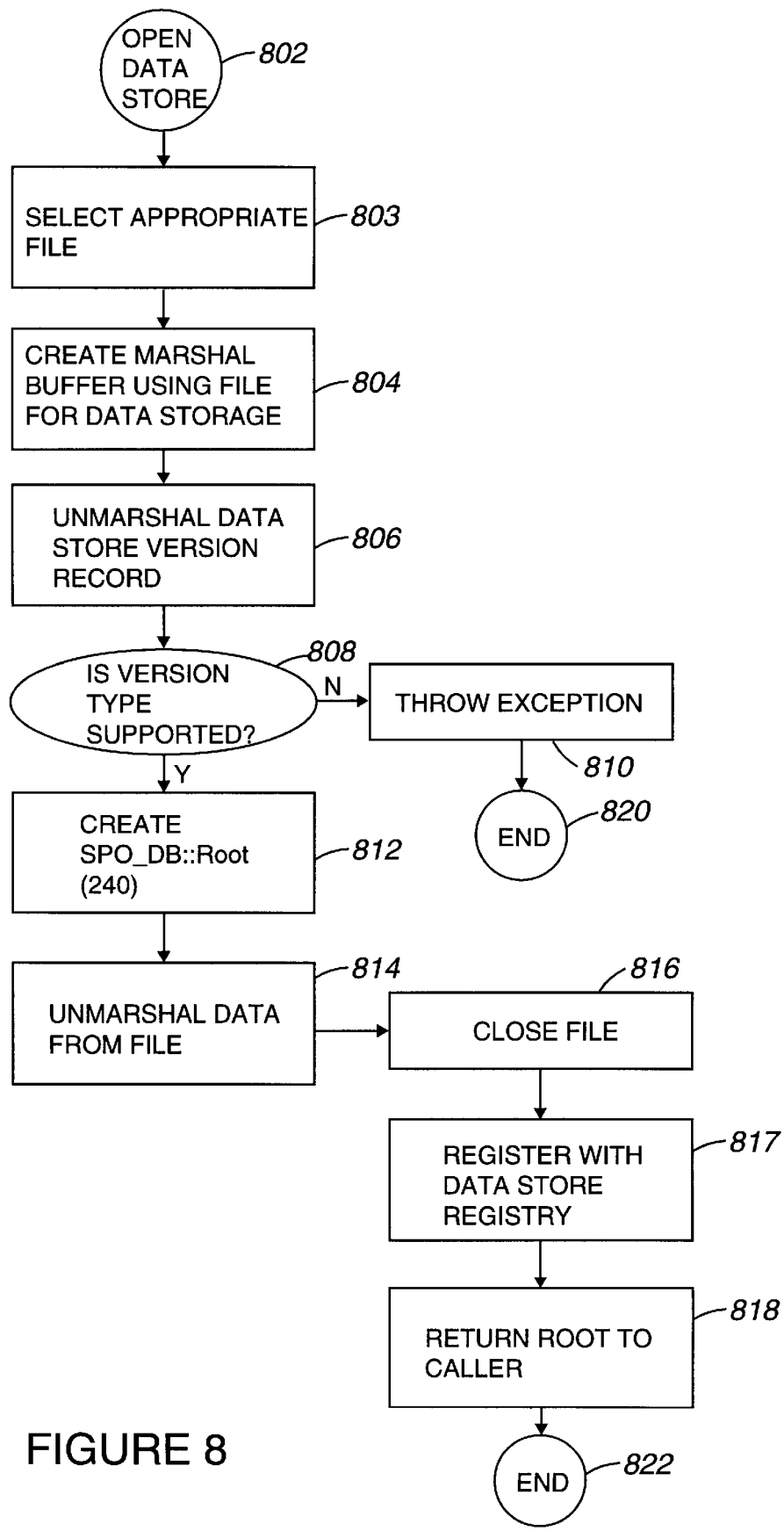
FIG. 8 is a process flow diagram which illustrates the steps associated with opening a data store in accordance with one embodiment of the present invention.

FIG. 8 is a process flow diagram which illustrates the steps associated with opening a data store in accordance with one embodiment of the present invention. The process begins at step 802 and proceeds to step 803 where an appropriate file is selected for data storage. That is, a data file is selected from files which may be located on a storage disk, for example, to be opened. A method of selecting an appropriate file will be described below with respect to FIG. 9. After an appropriate file is selected, a marshal buffer is created using the selected file for data storage in step 804. This marshal buffer is used to hold data in memory and is considered to be a "file marshal buffer" or a "marshal buffer file." Then, in step 806, the data store version record is unmarshaled from the data file using an unmarshal method which corresponds to the data store. As the format of the version record does not usually change, the version record may be used to identify the format of the data which is stored in the data file.

After the data store version record is unmarshaled from the data file, a determination is made in step 808 regarding whether the version type indicated by the version record is supported by the version of the simple persistence code. By way of example, when the schema in data store 226 of FIG. 2 is upgraded, the version associated with DBVersion 254 is changed so that the code which implements data store 226 may recognize and correctly interpret all supported versions. That is, the data store version record is checked to determine whether the file is supported as a data store. In some embodiments, the process of checking a version record may also entail a check to ascertain whether an appropriate file is being opened to serve as a data store. By way of example, the check may determine whether an electronic mail file is inadvertently being opened as a data store. If the version type is not supported, process control proceeds to step 810 where an exception is thrown to indicate that the version type is not supported. Then, the process of opening a data store terminates at step 820.

If it is determined in step 808 that the version type indicated by the version record of the data file is supported, then in step 812, a SPO_DB::Root type object is created. Once the SPO_DB::Root object is created, data is unmarshaled from the file into the structure associated with the SPO_DB::Root object, i.e., the marshal buffer file, in step 814. That is, data is unmarshaled from the file into the structure associated with the data store root object. The Interface Definition Language (IDL) compiler generates a compiled unmarshaling function which is used to unmarshal data from the file. Some embodiments of unmarshaling and marshaling functions are described in U.S. patent application Ser. No. 08/673,181, filed on Jan. 26, 1996, which is incorporated herein by reference. Hence, the actual unmarshal method used to unmarshal data from the file into the root structure is known. After data is unmarshaled from the marshal buffer file, the file is closed in step 816.

In step 817, the data store is registered with a data store registry, which, in one embodiment, is a data structure which contains a listing of data stores associated with a particular process on a distributed object system. After the data store is registered with the data store registry, the root is returned to the caller in step 818, i.e., the SPO_DB::Root created in step 218 is returned to the caller. Then, the process of opening the data store is completed at step 822. It should be appreciated that the data store root object remains in memory until a command is issued for the data store root object to be destroyed. Hence, several data stores may be open at any given point in time during the execution of a particular program.

Figure 9:
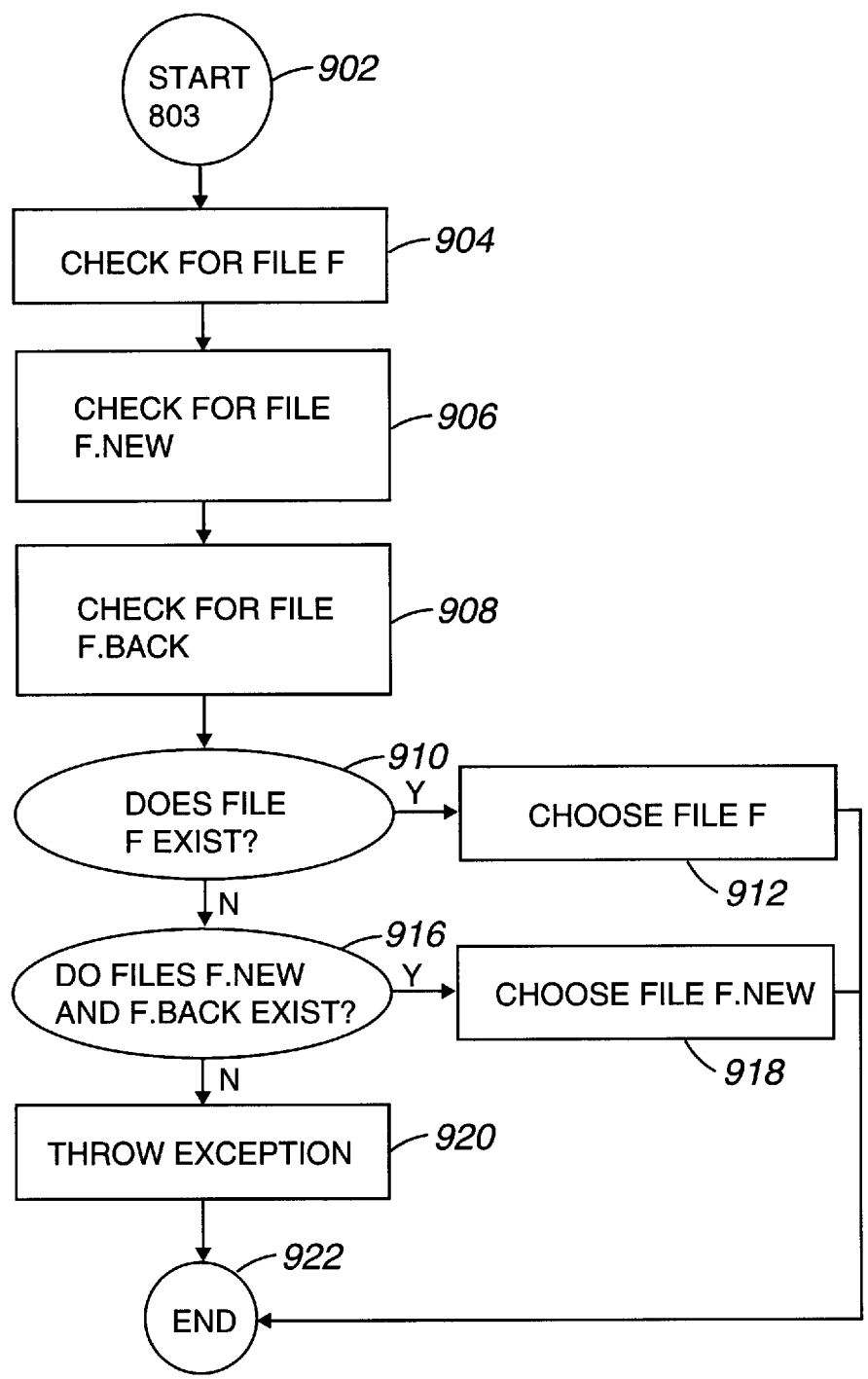
FIG. 9 is a process flow diagram which illustrates the steps associated with step 803 of FIG. 8 in accordance with one embodiment of the present invention.

Referring next to FIG. 9, a method of selecting an appropriate file for data storage, i.e., step 803 of FIG. 8, in accordance with one embodiment of the present invention will be described. In the described embodiment, an "appropriate file" refers to an intact version of a file which contains, or is acceptable for, storing information associated with a given invocation. In a typical situation, that is, if a process on a distributed object system is executing properly, a file "F" may be the appropriate file to choose for data storage. However, if a problem arises during the execution of the process of writing to a file such that the file may be corrupted, a file which is related to file F may be the appropriate file to choose, rather than file F. By way of example, a new file "F.NEW," which includes changes to be written to file F, may be created in the process of writing to file F to ensure that file F remains intact until the new file F.NEW is prepared. Additionally, a backup file "F.BACK" is also created in the process of writing to file F in order to ensure that backup data will be available in case a problem, as for example a system crash, arises during the process of writing to file F. After file F.NEW is created, file F is renamed as file F.BACK, and file F.NEW is renamed as file F. File F.BACK is then deleted.

The process of selecting an appropriate file begins at step 902. In step 904, a check is made to ascertain whether file F, the file which would usually be the file which is the target of a search for an appropriate file, exists. Then, a search is made in step 906 for file F.NEW. After the search is made for file F.NEW, a search is made for file F.BACK in step 908. Then, in step 910, a determination is made regarding whether file F exists. If file F exists, then file F is likely to be intact, and is selected as the appropriate file in step 912. If it is determined in step 910 that file F does not exist, the process control proceeds to step 916 which is the determination of whether both files F.NEW and F.BACK exist. If it is determined that both files F.NEW and F.BACK exist, file F.NEW is likely to be intact, and is chosen as the appropriate file in step 918. The existence of both files F.NEW and F.BACK, while file F does not exist, indicates that file F has been overwritten and that the steps of renaming file F.NEW as file F and deleting file F.BACK are assumed not to have not occurred. Hence, file F.NEW is assumed to contain the information which would be contained in file F if that file existed. File F.NEW is therefore assumed to be the appropriate file to select. After file F.NEW is selected in step 918, the process of selecting an appropriate file ends at step 922.

Returning to step 916, if the determination in step 916 is that file F.NEW and file F.BACK do not both exist, given that the determination was previously made in step 910 that file F does not exist, an exception is thrown in step 920 which indicates that an appropriate file does not exist. Then, the process of selecting an appropriate file is terminated at step 922.

Figure 10:
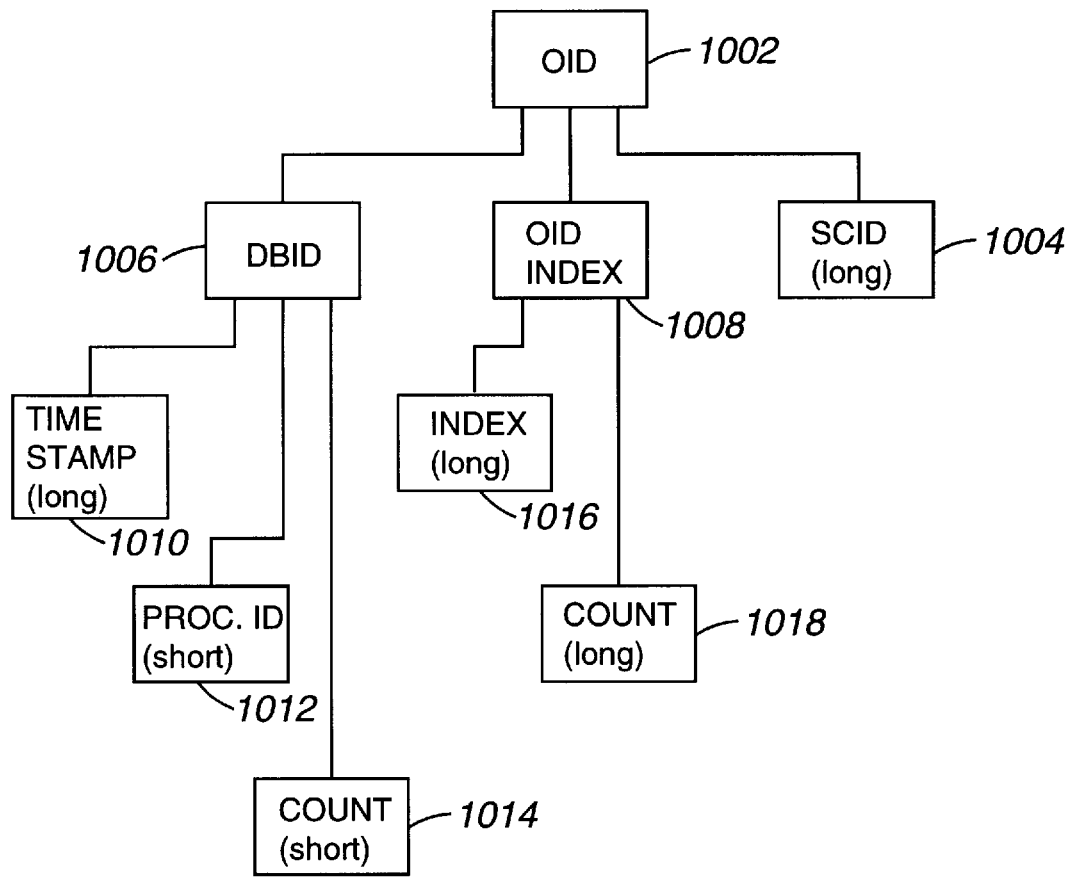
FIG. 10 is a diagrammatic representation of an Object Identifier (OID) in accordance with one embodiment of the present invention.

As mentioned above, an object identifier may be used to uniquely identify a data store object and the data store with which the object is associated. FIG. 10 is a diagrammatic representation of an object identifier in accordance with one embodiment of the present invention. An object identifier (OID) 1002 is a data structure which contains information that uniquely identifies an object with which OID 1002 is associated, and is used in the processes of marshaling and unmarshaling object references, as will be described below with respect to FIGS. 12 and 13. In the described embodiment, OID 1002 includes a subcontract identifier (SCID) 1004, a data store, or, database, identifier (DBID) 1006 and an OID index 1008.

In one embodiment, SCID 1004 is of type "long," i.e., a long integer, and uniquely identifies the subcontract associated with the object identified by OID 1002. The appropriate data store for the object identified by OID 1002 may be determined through the use of DBID 1006. DBID 1006 is a nested structure which includes a time stamp 1010, a process identifier 1012 and a count variable 1014. In the illustrated embodiment, time stamp 1010 is of type long and provides information which pertains to the last time a particular data store was accessed. Process identifier 1012 is of type "short," i.e., a short integer, and identifies the process which created the data store associated with the object identified by OID 1002; and count variable 1014, which is of type short, is a counter which is incremented each time a data store is created. Process identifier 1012 is used to check that multiple processes which concurrently create data stores create unique DBIDs 1006 that may be opened by other processes. After the file has been created, process identifier 1012 is no longer associated with a process. In general, time stamp 1010, process identifier 1012, and count variable 1014 are designated such that the likelihood that more than one data store on the same host has the same DBID 1006 is low.

According to one embodiment of the present invention, OID index 1008 is a structure which contains an index 1016 and a use count 1018. OID index 1008 is directly associated with an object reference, and may be used to associate the object reference with an appropriate object. Index 1016, which in the illustrated embodiment is of type long, allows for a quick indexing through a list of objects associated with a data store to find the object identified by OID 1002. In other words, index 1016 locates the relative location of an object in a list, or sequence, of objects which are associated with the data store identified by DBID 1006. Count 1018, also known as a use count, is incremented each time index 1016 is reused. Count 1018, which in the illustrated embodiment is of type long, may be used to determine the validity of the object reference associated with index 1016. By way of example, an object reference may be associated with an object located in a given location, or slot, in a list of objects. If that object has been deleted, then any object reference which is associated with the deleted object may no longer be valid. An outdated value of count 1018 typically indicates that the associated object reference is invalid.

Figure 11:
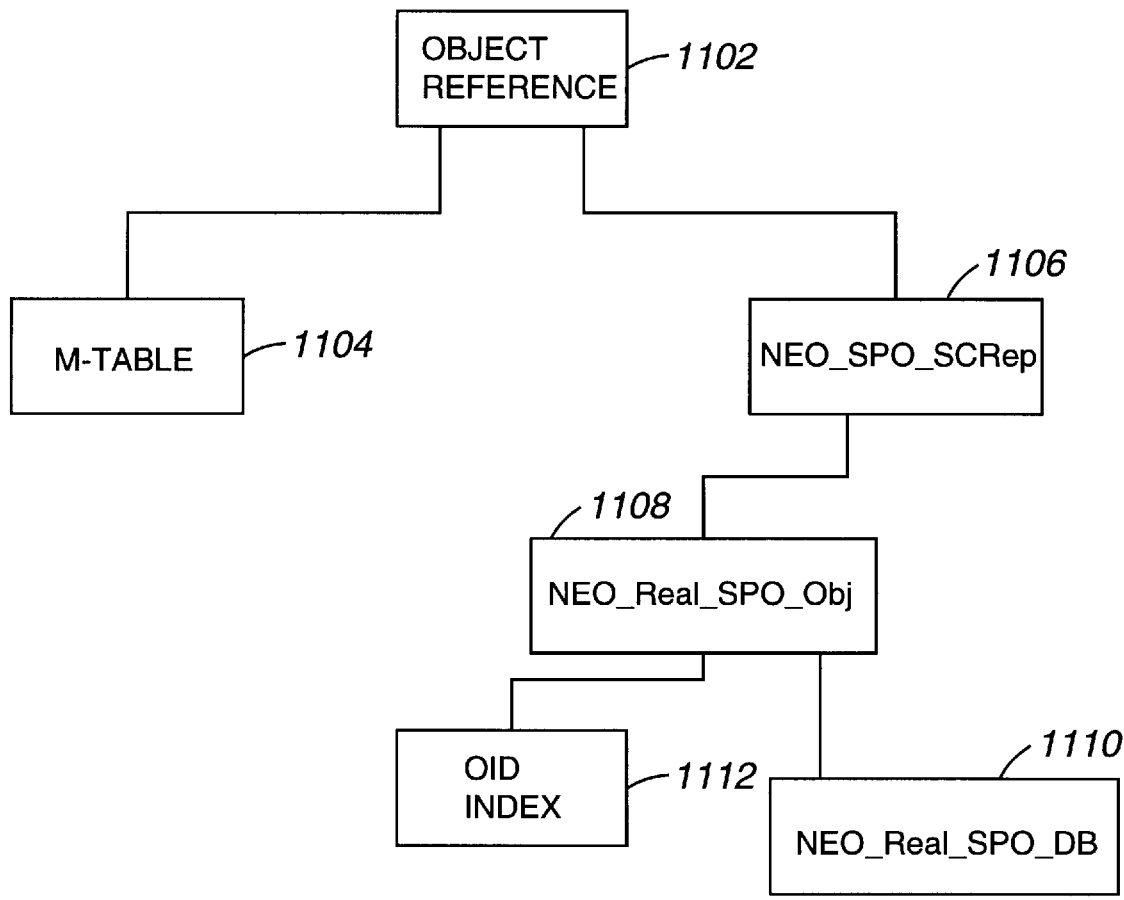
FIG. 11 is a diagrammatic representation of an object reference and elements associated with the object reference in accordance with one embodiment of the present invention.

FIG. 11 is a diagrammatic representation of one embodiment an object reference in accordance with the present invention. Object reference 1102 is associated with a method table, or m-table, 1104 and a subcontract representation 1106. M-table 1104 contains pointers to stub functions which are associated with methods which may be invoked, and can be either a local m-table or a remote m-table. A local m-table is associated with methods used in a local process, whereas a remote, or standard, m-table is associated with methods used in a remote process. In one embodiment, if object reference 1102 is associated with a process which is local, then m-table 1104 will be a local m-table. Similarly, it object reference 1102 is associated with a remote process then m-table 1104 will be a remote, or standard, m-table. As previously mentioned, persistent objects are associated with remote m-tables.

Subcontract representation, or NEO_SPO_SCRep, 1106, which is represented in FIG. 2 as NEO_SPO_SCRep 228, is associated with a NEO_Real_SPO_Object 1108, which is represented in FIG. 2 as NEO_Real_SPO_Obj 210. The NEO_Real_SPO_Obj referenced by NEO_SPO_SCRep 1106 is associated with an OID index 1112, which was described above with reference to FIG. 10 as OID index 1008, and a NEO_Real_SPO_DB. NEO_Real_SPO_DB is represented in FIG. 2 as NEO_Real_SPO_DB 239.

A distributed object, persistent or otherwise, has basic "life cycle operations," which typically include, but are not limited to, invocation, marshaling, unmarshaling, creation, and destruction. Object invocation is the process of invoking a servant object to cause that servant to perform some operation. An example of object invocation is the invocation of either a get attribute or set attribute method, as was mentioned earlier with respect to FIG. 3. The operations of marshaling, unmarshaling, creation, and destruction of persistent objects will be described below with respect to FIGS. 12 through 16, respectively.

Figure 12:
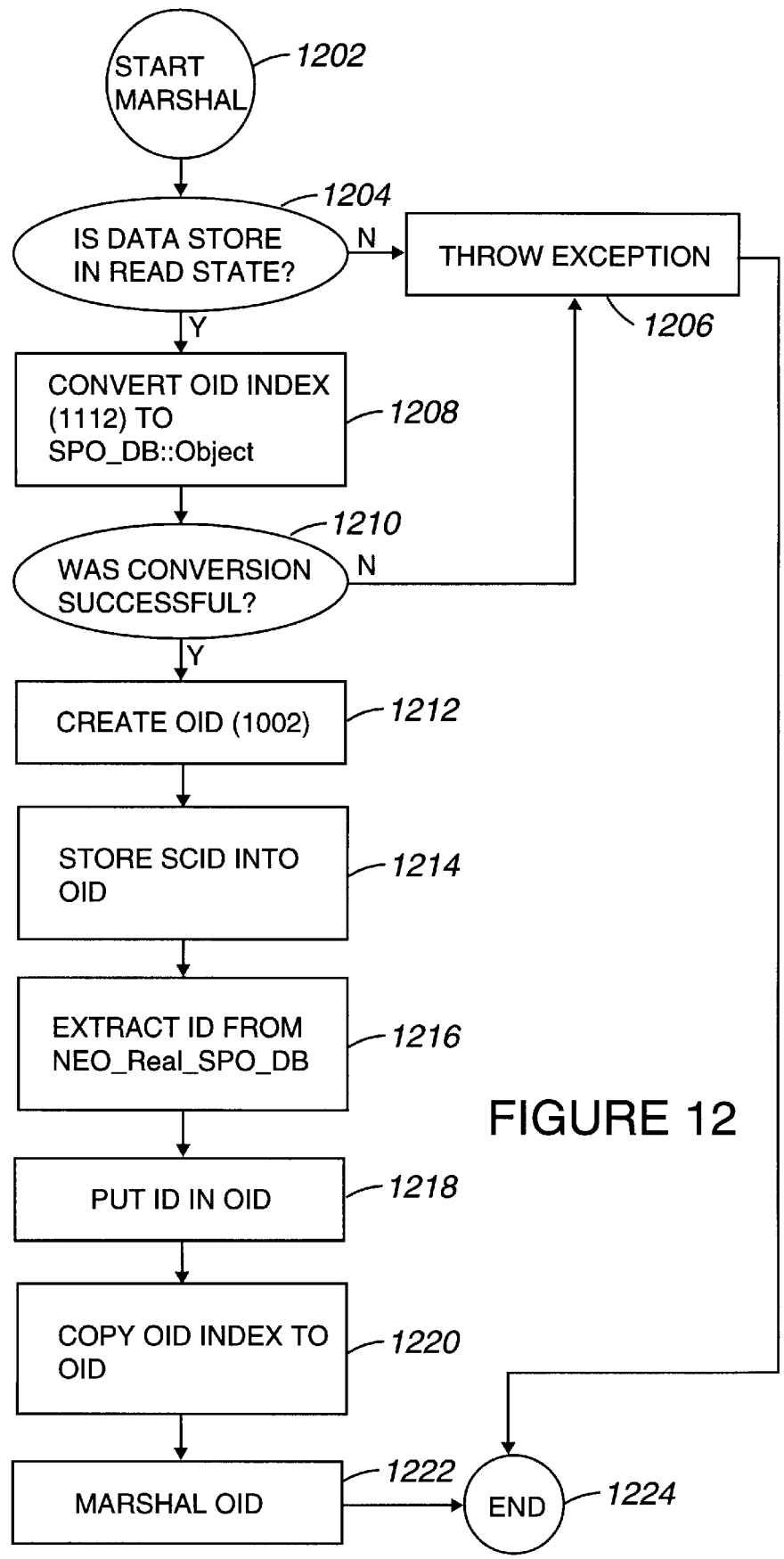
FIG. 12 is a process flow diagram which illustrates the steps associated with a marshaling process in accordance with one embodiment of the present invention.

FIG. 12 is a process flow diagram which illustrates the steps associated with marshaling an object reference into a marshal buffer in accordance with one embodiment of the present invention. Specifically, the process of marshaling an object reference associated with a persistent object will now be described. The process begins at step 1202 and proceeds to step 1204 which is the determination of whether the data store associated with the object reference is in a read state. If the data store is not in a read state, then an exception is thrown in step 1206, and the marshaling process ends at step 1224. On the other hand, if the data store is in a read state, then the OID index, as described above with respect to FIGS. 10 and 11, is obtained from the object reference and is converted into an instance of an SPO_DB::Object in step 1208. A determination is made in step 1210 regarding whether the conversion of the OID index to an instance of an SPO_DB::Object was successful. In one embodiment, this determination is an error check used to determine whether the object reference which is to be marshaled is valid. If the conversion of the OID index was not successful, then an exception is thrown in step 1206 to indicate that the object reference is no longer valid, and the marshaling process ends at step 1224.

If the OID index was successfully converted to an instance of an SPO_DB::Object, then process control proceeds to step 1212 where an OID, as described above with respect to FIG. 10, is created. After the OID is created, a subcontract identifier (SCID), which corresponds to the subcontract associated with the object identified by the OID, is stored into the OID in step 1214. This subcontract identified by the SCID is the subcontract associated with the subcontract representation described with respect to the object reference of FIG. 11. The SCID is fixed, as there is typically only a single subcontract associated with the OID. After the SCID is stored into the OID, a data store identifier, or a data base identifier (DBID), is extracted from the instance of NEO_Real_SPO_DB which is associated with the SPO_DB::Object of step 1208. Information contained as a part of the DBID includes, but is not limited to, a time stamp, a process identifier, and a counter, as described with earlier with respect to FIG. 10. The DBID is put, or stored, in the OID in step 1218.

After the DBID is stored in the OID, the OID index associated with the object reference is copied into the OID in step 1220. Then, the OID is marshaled into a marshal buffer in step 1222. The marshaling function used to marshal the OID is obtained from the IDL compiler and is based on the IDL definition for the OID. Finally, the marshaling process is completed in step 1224.

Once an object reference is marshaled into a marshal buffer on one domain, it may then be unmarshaled from the marshal buffer in another domain. The process of unmarshaling an object reference may be thought of as the reverse of the process of marshaling an object reference. In other words, marshaling an object reference entails encoding the object reference in a marshal buffer, whereas unmarshaling an object reference from a marshal buffer entails decoding the marshaled object reference.

Figure 13:
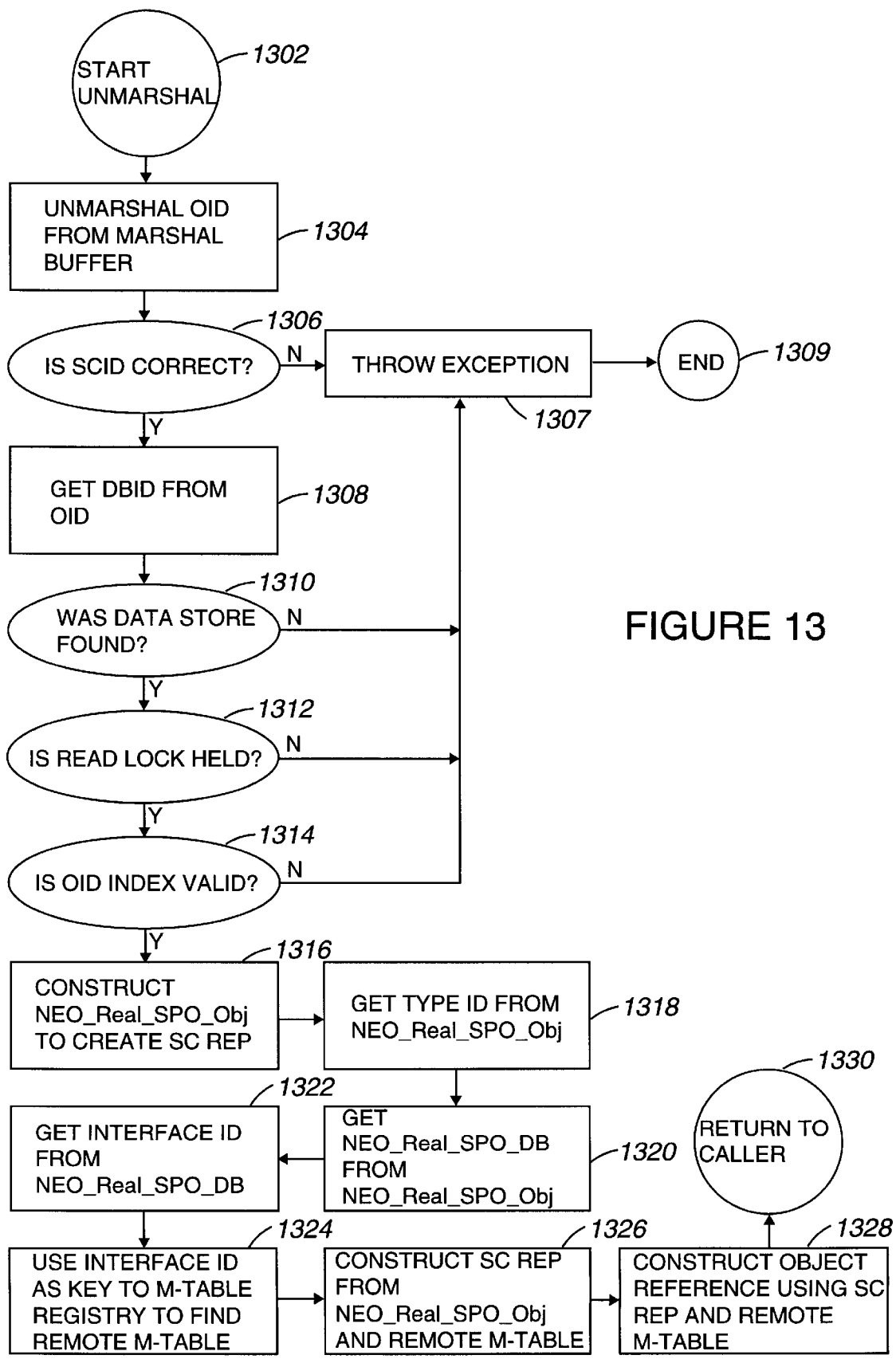
FIG. 13 is a process flow diagram which illustrates the steps associated with an unmarshaling process in accordance with one embodiment of the present invention.

Referring next to FIG. 13, a process of unmarshaling data from a marshal buffer will be described in accordance with one embodiment of the present invention. The process of unmarshaling data an object reference contained in a marshal buffer begins at step 1302 and proceeds to step 1304 where an OID is unmarshaled from the marshal buffer in which it is encapsulated. After the OID is unmarshaled, a determination is made regarding whether the SCID which corresponds to the OID is correct, i.e., whether the SCID has a value that is expected. If the determination is that the SCID is not correct, then an exception is thrown in step 1307, and the process of unmarshaling data terminates at step 1309.

If the determination in step 1306 is that the SCID is correct, then in step 1308, the DBID is obtained from the OID. As multiple data stores may be open during the course of a given process, the particular data store which pertains to the object reference that is contained in the marshal buffer is often not known a priori. The DBID is used to determine the data store which corresponds to the object reference. In the described embodiment, the DBID is used as a key in a data store registry which contains information pertaining to all data stores which are open in the same process. In one embodiment, the data store registry is a data structure which is used as a lookup table which stores data store records using DBIDs as indexes.

After the DBID is obtained from the OID, process control moves to step 1310 where a determination is made regarding whether a data store which is identified by the DBID was found. If an appropriate data store was not found, then an exception is thrown in step 1307 and the procedure terminates at step 1309. On the other hand, if an appropriate data store was found, then in step 1312, it is determined whether the data store permits read operations. In the described embodiment, the determination of whether the data store permits read operations is the determination of whether a read lock is held. If the data store is not open to read operations, then an exception is thrown in step 1307. Otherwise, if the data store is open to read operations, then in step 1314, a determination is made regarding whether the OID index, which may be obtained from the OID, is valid. If the OID index is not valid, then an exception is thrown in step 1307.

If it is determined in step 1314 that the OID index is valid, process control proceeds to step 1316 where a data store object wrapper is constructed using the OID index, and is the NEO_Real_SPO_Obj 210 as identified in FIG. 2. A data store object wrapper is used to "wrap" or package code which may be used to create a real object. In other words, an object wrapper may be used to wrap code which is relevant to the transformation of an instance of an SPO_DB::Object into a NEO_Real_SPO_Obj, i.e., the NEO_Real_SPO_Obj is a wrapper around the actual object representation which is the SPO_DB::Object. In general, the function of the object wrapper is to separate an associated subcontract implementation form the data store implementation so that the same subcontract may be used with different data stores. After a data store object wrapper is constructed, the type identifier is obtained from the object wrapper in step 1318. Then, in step 1320, the data store object is obtained from the object wrapper.

After the data store object is obtained from the object wrapper, the interface identifier (ID) is obtained from the data store in step 1322. The interface ID may be found using the type ID obtained in step 1318 as an argument. In step 1324, the interface ID is used as a key in an m-table registry to find the appropriate m-table which may be used in the construction of an object reference. An m-table registry is a data structure which contains a list of m-tables. In one embodiment, for object references which pertain to persistent objects, the appropriate m-table is a remote m-table. After the appropriate m-table is found in the m-table registry, process control proceeds to step 1326 where a subcontract representation, which is to be used in creating an object reference, is constructed, using the wrapper and the remote m-table. In step 1328, an object reference as described above with respect to FIG. 11 is constructed using the subcontract representation and the remote m-table. Finally, the object reference is returned to the process which invoked the unmarshal method at step 1330.

Figure 14:
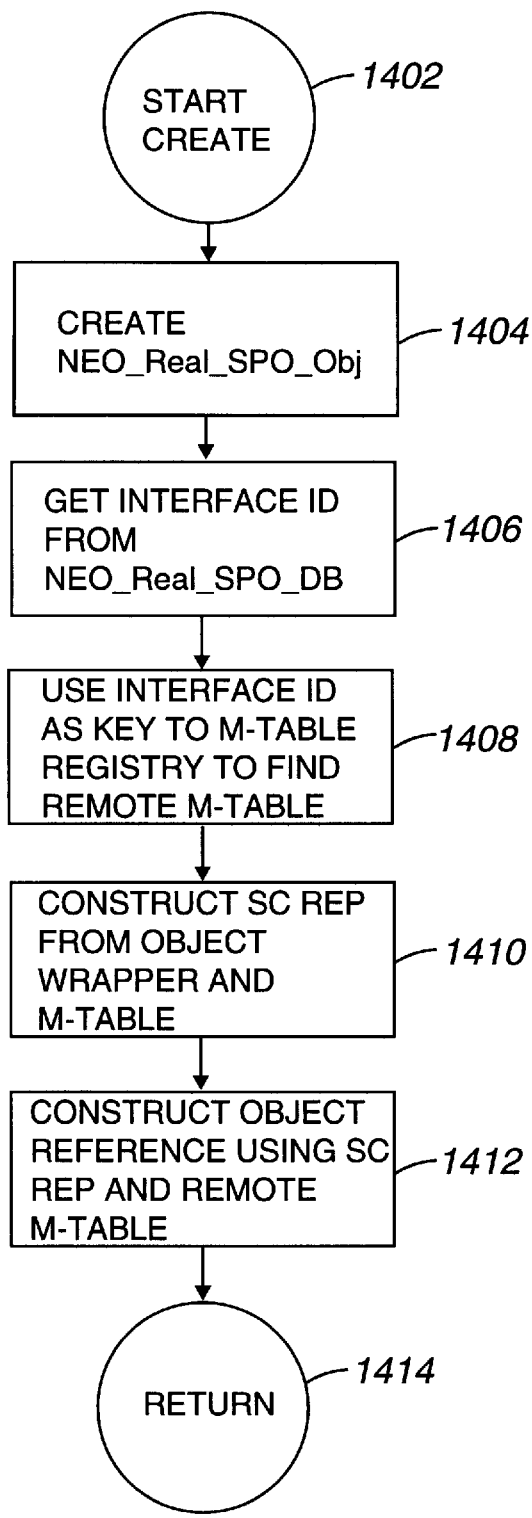
FIG. 14 is a process flow diagram which illustrates the steps associated with an object creation process in accordance with one embodiment of the present invention.

FIG. 14 is a process flow diagram which shows the steps associated with creating an object reference in accordance with one embodiment of the present invention. With reference to FIG. 2, create methods are defined on NEO_SPOManager 242. The process of creating an object reference begins at step 1402 when a create process is called with a type identifier as an argument. The type identifier may be determined if the interface identifier is known. By way of example, an interface identifier may be used as an index in an interface repository, i.e., a listing of interfaces, to associate the interface identifier with a corresponding type identifier. In step 1404, a NEO_Real_SPO_Obj, for transforming an instance of an SPO_DB::Object into a real object is created, as will be described below with respect to FIG. 15.

After this object wrapper is constructed, an interface identifier is obtained from the data store, i.e., the NEO_Real_SPO_DB, in step 1406. The interface ID is found using the type ID that was passed as an argument to the create method of NEO_SPOManager 242 of FIG. 2, when a create process is called. In step 1408, the returned interface ID is then used as a key in an m-table registry to find the m-table appropriate for the construction of an object reference for the persistent object. As previously mentioned, in one embodiment, the appropriate m-table is a remote m-table. After the appropriate m-table is found in the m-table registry, process control proceeds to step 1410 where a subcontract representation, indicative of a request for service, is constructed using the object wrapper and the remote m-table. In step 1412, an object reference as described above with respect to FIG. 11 is constructed using the subcontract representation and the remote m-table. Finally, the newly created object reference is returned to the process which called the create process at step 1414.

Figure 15:
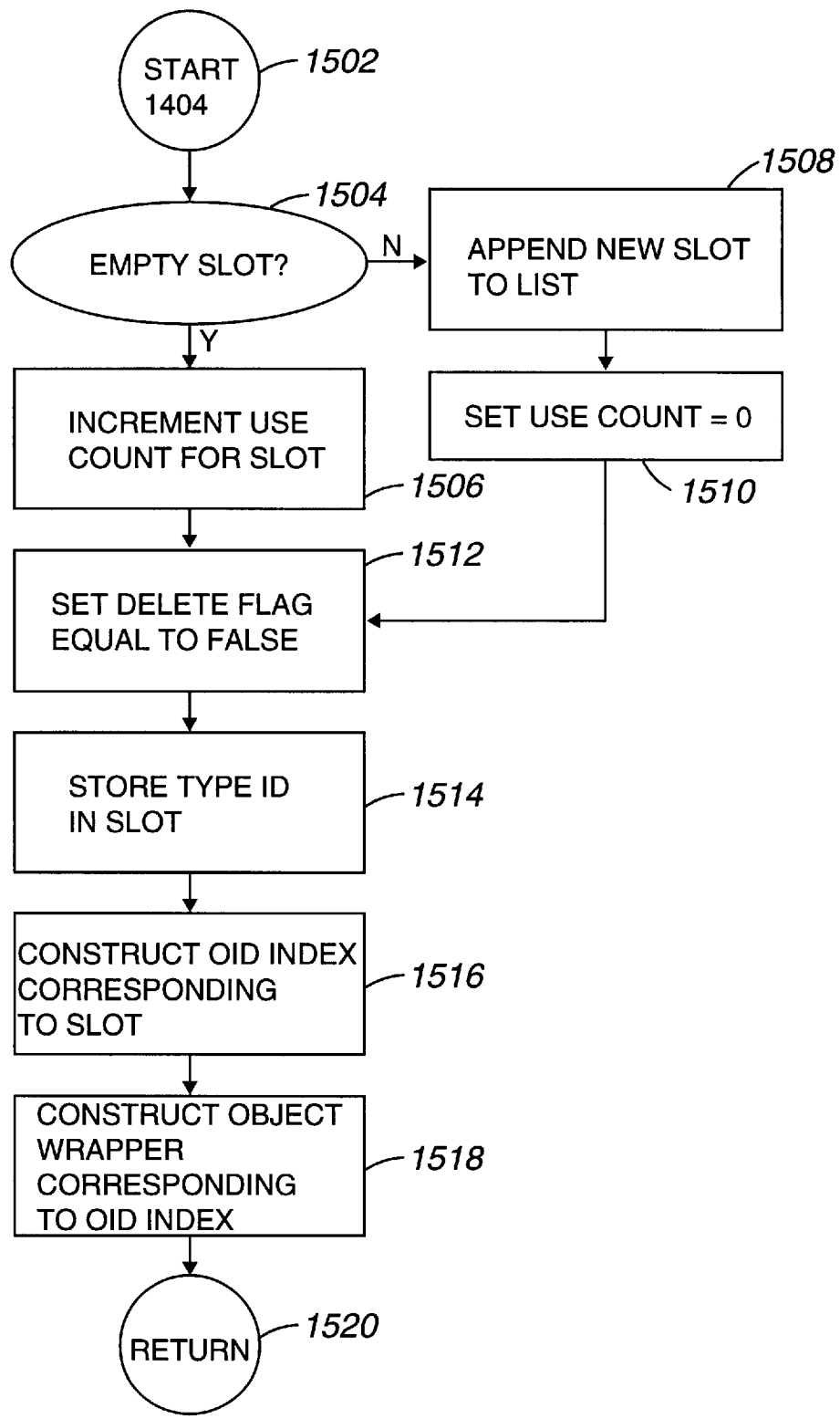
FIG. 15 is a process flow diagram which illustrates step 1404 of FIG. 14 in accordance with one embodiment of the present invention.

Referring next to FIG. 15, a method of creating an object wrapper of type NEO_Real_SPO_Obj (step 1404 of FIG. 14) in accordance with one embodiment of the present invention will be described. The process of creating an object wrapper begins with a call to create an object wrapper in step 1502. A determination is made regarding whether a new slot for an object is available in the SPO_DB::Object list, or sequence, in step 1504. As previously described with respect to FIG. 5, a delete flag associated with each SPO_DB::Object may be set to identify empty, or unused, slots in a list of objects associated with a data store. In one embodiment, the determination of whether an empty slot is available includes searching through a list of objects for a delete flag which is set to true. Other, more efficient, embodiments may include building a secondary data structure, as for example a free list of empty slots. Such an embodiment avoids the cost of searching for an empty slot. Many such secondary structures are possible, and may include, but are not limited to, lists, bitmaps, and various forms of tables and trees.

If it is determined in step 1504 that there are no available empty slots, then in step 1508, a new slot is appended onto the end of the list of SPO_DB::Objects. The use count variable associated with the object is set to zero to initialize the newly appended slot in step 1510. As mentioned earlier with respect to FIGS. 5 and 11, each SPO_DB::Object is associated with an OID, which includes a use count variable that is incremented each time the slot occupied by the object is reused. After the slot is initialized, the delete flag associated with the object in the slot is set to false in step 1512, to indicate that the slot is in use.

If it is determined in step 1504 that there is an empty slot available in the list of objects, then process flow proceeds to step 1506 in which the use count associated with the slot is incremented to indicate that the slot has been reused. Once the use count is incremented, the delete flag associated with the object in the slot is set to false in step 1512 to indicate that the slot is in use. Then, in step 1514, the type identifier is stored in the slot. After the type identifier is stored in the slot, the OID index which corresponds to the slot is constructed in step 1516. The OID index, as described earlier with respect to FIG. 10, includes an index which is used to enable an efficient index of the list of objects and the use count. In step 1518, the object wrapper which corresponds to the OID index is constructed using methods which are well-known to those of skill in the art of distributed object programming. The object wrapper is then returned to the caller in step 1520.

Figure 16:
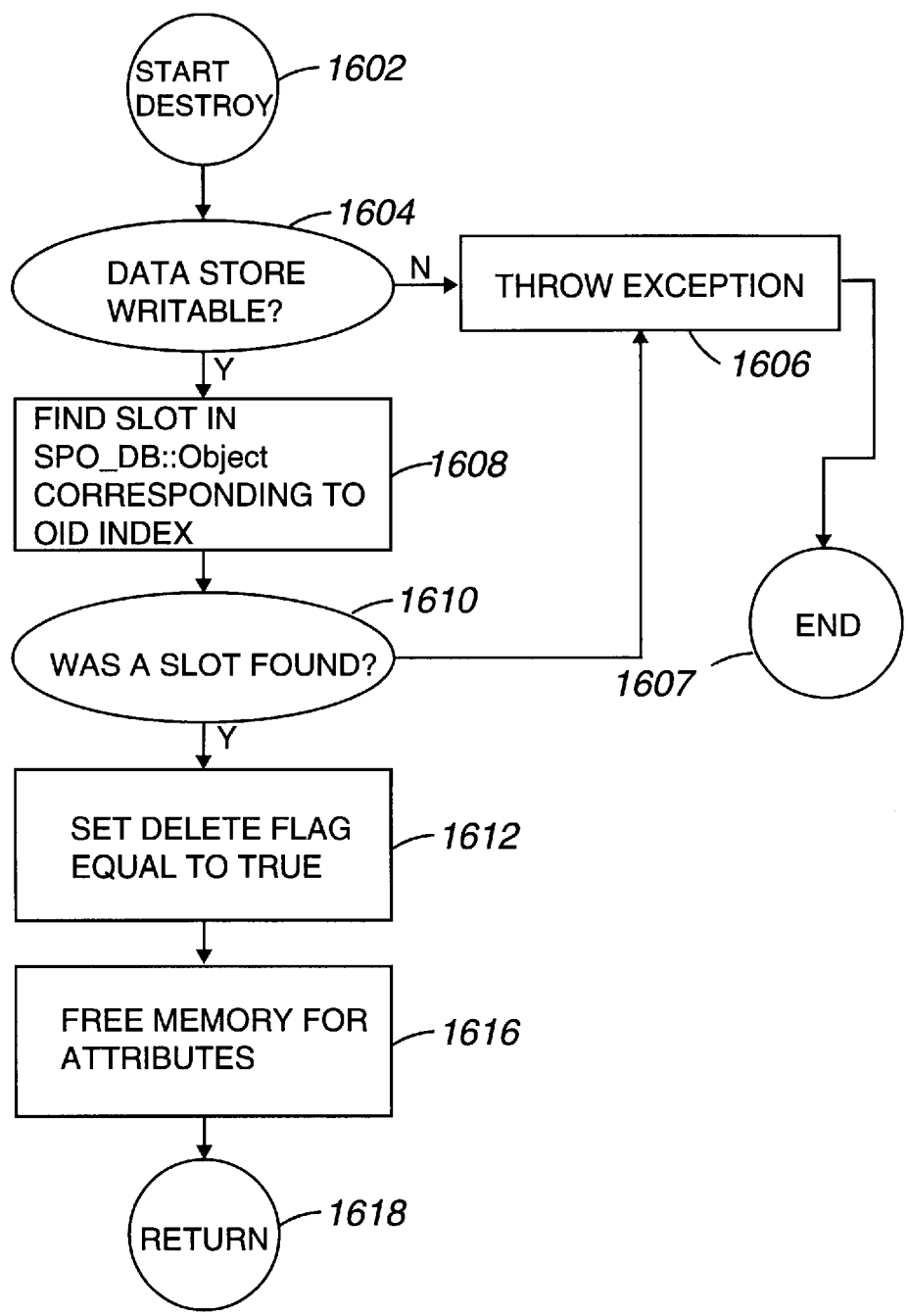
FIG. 16 is a process flow diagram which illustrates the steps associated with a process for destroying an object in accordance with one embodiment of the present invention.

FIG. 16 is a process flow diagram which shows the steps associated with destroying a data store object in accordance with one embodiment of the present invention. The process begins at step 1604 with a call to destroy an object stored in a data store. In step 1604, a determination is made regarding whether the data store in which the object is stored is open to write operations. If the data store is not writable, then an exception is thrown in step 1606 to indicate that the object could not be destroyed, and the process terminates at step 1607. On the other hand, if the data store is writable, then process flow proceeds to step 1608 where the slot in the SPO_DB::Object list which corresponds to the object to be destroyed is found. The OID index which corresponds to the object to be destroyed may be used as an index into the list of objects. In step 1610, it is determined whether a slot corresponding to the OID index for the object to be destroyed was found. If an appropriate slot was not found, then an exception is thrown in step 1606 to indicate that the object could not be destroyed, and the process terminates at step 1607.

If it is determined in step 1610 that a slot corresponding to the OID index for the object to be destroyed was found, then the delete flag for the slot is set equal to true in step 1612 to indicate that the slot is empty. After the delete flag is set, process control proceeds to step 1616 where the memory associated with the slot is freed for attributes. That is, the memory associated with the slot is cleared. Finally, after memory is freed, the process returns to the caller at step 1618.

As will be appreciated by those skilled in the art, data stores are typically stored in files on computer disks, CD-ROMs, or the like. When the data store in the file is accessed and modified, the data store file, herein referred to as file "X," must typically be modified to reflect the changes made to the data store. In order to protect the integrity of the data store during system crashes, a modified data store is first written to a file other than file X. By writing the modified data store to a different file prior to replacing file X with the different file and also creating a backup file for X, there will typically always be an intact file which contains some version of the data store, even in the event of a system crash. As such, the process of committing a data store to a file on a computer disk or the like typically involves the creation of temporary data files in order to protect against the possibility of corrupting a data store.

Figure 17A:
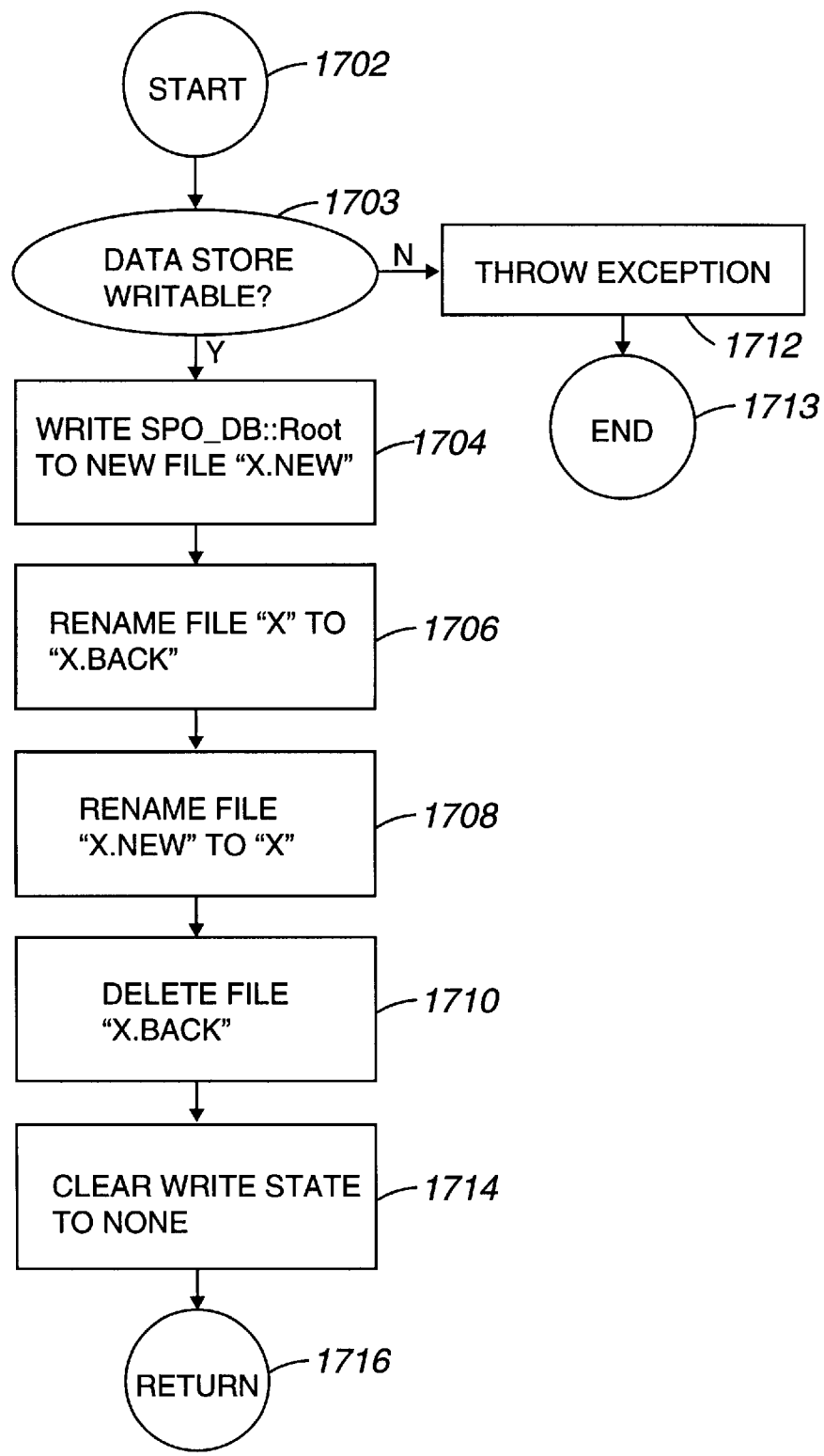
FIG. 17A is a process flow diagram which illustrates the steps associated with a commit process in accordance with one embodiment of the present invention.

FIG. 17A is a process flow diagram which shows the steps associated with a data store commit mechanism by which a data store file is updated in accordance with one embodiment of the present invention. The process begins at step 1702 when the commit process is called. In step 1703, a determination is made regarding whether the data store which is the target of the commit process is open to write operations. If the data store is not writable, then an exception is thrown in step 1712 to indicate that the data store could not be written to, and the commit process is terminated at step 1713. On the other hand, if the data store is writable, then process flow proceeds to step 1704 where the instance of the SPO_DB::Root class which corresponds to the changed version of the data store is written to a new file, which will be referred to as file "X.NEW." The process of writing the instance of the SPO_DB::Root class to a file X.NEW will be described below with reference to FIG. 17B. After file X.NEW is created, process control proceeds to step 1706 where file X is renamed as file "X.BACK." Then, in step 1708, file X.NEW is renamed as file X. By renaming file X as file X.BACK, in the event that a system error occurs in the process of renaming file X.NEW as file X, file X.BACK will contain an uncorrupted, albeit older, version of the data store.

After file X.NEW is renamed as file X, file X.BACK is deleted in step 1710. Then, in step 1714, the write state of the data store, i.e. the modified data store contained in file X, is cleared to "none." Clearing the write state of the data store and, hence, the data store file, to none indicates that no write or read operations may occur on the data store until a calling process requests permission to either read from or write to the data store file. Once the write state is cleared to none, the results of the commit process are returned to the caller at step 1716.

Figure 17B:
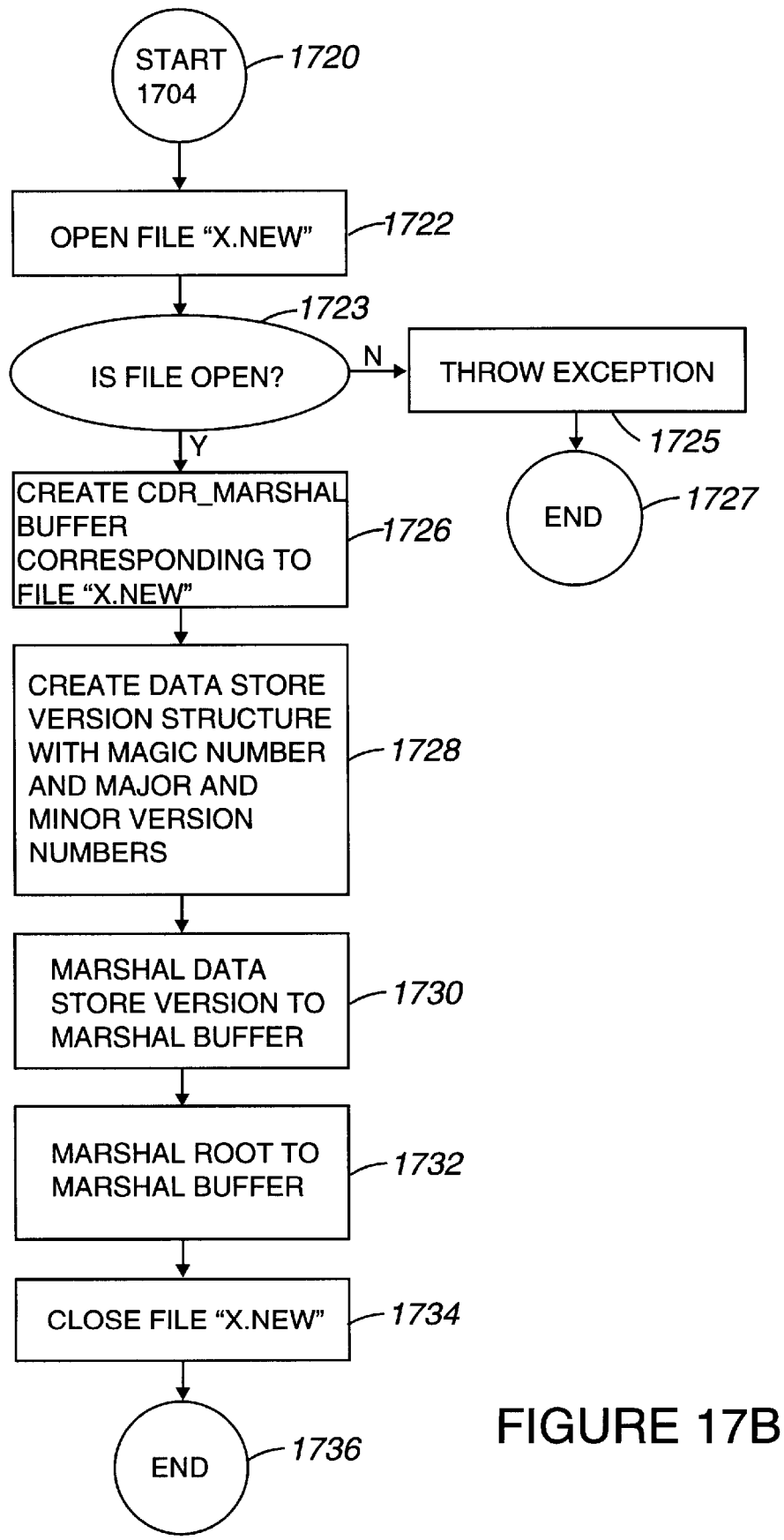
FIG. 17B is a process flow diagram which illustrates step 1704 of FIG. 17A in accordance with one embodiment of the present invention.

Referring next to FIG. 17B, a method of writing an instance of an SPO_DB::Root class to a new file, i.e., step 1704 of FIG. 17A, in accordance with one embodiment of the present invention will be described. The process begins at step 1720 with a request to write a root object, i.e., an instance of an SPO_DB::Root class, to a new file, namely file X.NEW. In step 1722, an attempt is made to open file X.NEW. A determination is made in step 1723 regarding whether file X.NEW was successfully opened. If the determination is that file X.NEW was not successfully opened, then an exception is thrown in step 1725, and the attempt to write the root object to file X.NEW is terminated at step 1727.

In one embodiment, if the determination in step 1723 is that file X.NEW was successfully opened, then process control proceeds to step 1726 where a Common Data Representation (CDR) marshal buffer which corresponds to file X.NEW is created. CDR is the name of an encoding rule specified by the Internet Interoperable Protocol (IIOP). After the CDR marshal buffer is created, the data store version structure is created with a "magic number" and both major and minor version numbers in step 1728. The data store version structure, or record, provides information pertaining to the particular version of the data store. In some embodiments, the particular version of the data store may relate to when the data store was last accessed or modified. The data store version record may be used to determine whether a file which is being utilized as a data store is indeed a valid data store. A magic number is a hard-wired number, or other fixed description, which is used to characterize a particular kind of data file. By way of example, a file which begins with the characters "%!" is normally understood to be a postscript file. Similar conventions are used for many other file types. A version number is used to indicate which revision of a file or a message is in use. Version numbers are often expressed using two components, e.g., a major version number and a minor version number. The exact interpretation of major and minor version numbers is application specific; however, major and minor version numbers are generally intended to reflect the degree of difference between versions.

After the data store version structure is created, the data store version structure is marshaled into the CDR marshal buffer in step 1730. In the described embodiment, the data store version record is marshaled directly into file X.NEW which is represented by the CDR marshal buffer. It should be appreciated that in most typical cases, data is not marshaled directly into a file. In step 1732, the root object is marshaled into the CDR marshal buffer. That is, the data store is marshaled into the CDR marshal buffer which represents file X.NEW. In the described embodiment, IDL-generated marshaling functions use a marshal buffer to marshal IDL-defined data types in terms of more primitive data types. Finally, file X.NEW is closed in step 1734, and the process of string an instance of a SPO_DB::Root class to file X.NEW ends at step 1736.

As described above with respect to FIG. 2, the persistence data storage mechanism of the invention has a "pluggable back-end," i.e., an interface which enables different data stores to be used with the persistence framework. Subcontracts are utilized as a part of the interface which is used to associated an object reference to a corresponding back-end representation, or data store. A persistence data storage mechanism with a pluggable back-end is flexible, due to the fact that a wide variety of back-end representations may be used with a given persistence framework. A pluggable back-end may utilize a data structure, as for example a data structure which is a registry of data store implementations, that contains functions used for creating and opening data stores, as a data store needs to be associated with an identifier which maps to an appropriate mechanism for creating or opening an appropriate data store.

Figure 18:
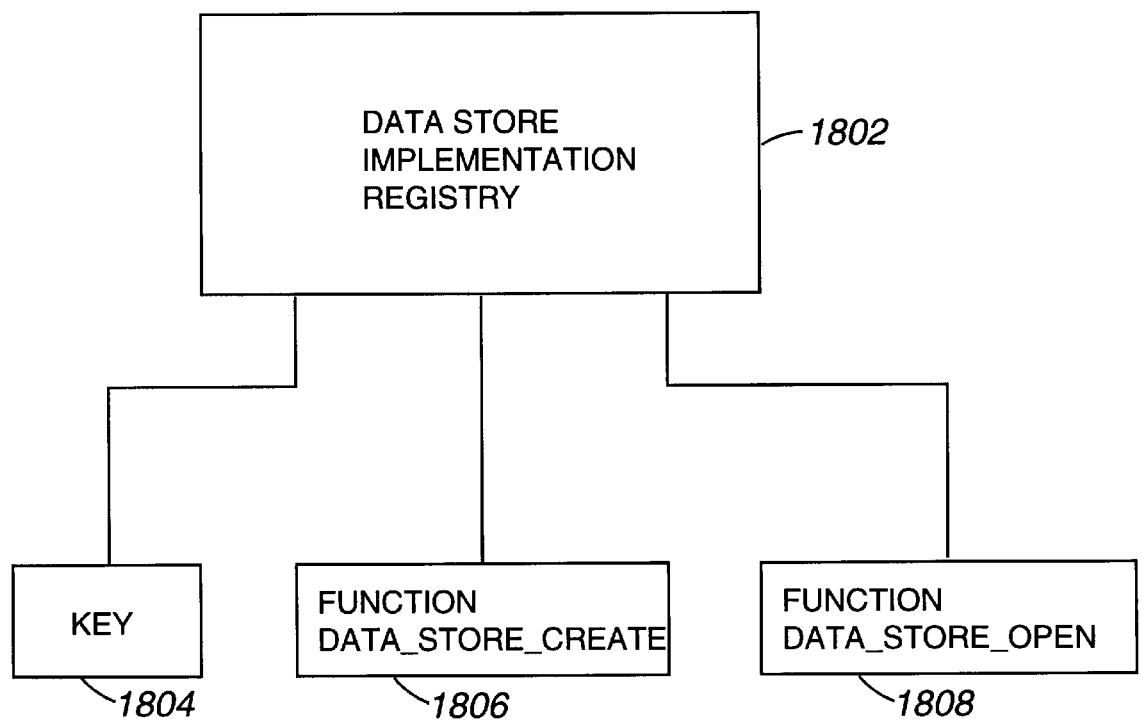
FIG. 18 is a diagrammatic representation of a data store implementation registry in accordance with one embodiment of the present invention.

FIG. 18 is a diagrammatic representation of a data structure which is a data store implementation registry in accordance with one embodiment of the present invention. Data store implementation registry 1802 contains information used to create and open data stores. It should be appreciated that data store implementation registry 1802 and the data store registry as discussed above with respect to FIG. 13 are not the same. Whereas data store implementation registry 1802 includes information used to create and open data stores, the data store registry contains a listing of data stores which are currently in existence. Data store implementation registry 1802 may be used to find a particular data store implementation, which may then be used to call an appropriate function to either create or open a particular data store.

Data store implementation registry 1802 typically includes a list of keys 1804, functions used to create data stores 1806, and functions used to open data stores 1808. Key 1804 is typically a string which serves to identify the type associated with a data store implementation. That is, key 1804 typically provides a name for a mechanism used for a given implementation. In embodiments, key 1804 may be a name which corresponds to a UNIX data base manager (dbm), if a UNIX dbm is utilized. Data store create function 1806 may take as an argument a string which is a data store identifier. A data store identifier may either be a file name for a data store, or a relational database identifier. Data store open function 1808, like data store create function 1806, may take a string which is a data store identifier as an argument. One version of data store open function 1808 was previously described with respect to FIG. 8. It should be appreciated that data store create function 1806 and data store open function 1808 may each take any number of arguments, and are not limited to an argument which is a data store identifier. By way of example, key 1804 may be an argument to either or both of the functions.

If data store create function 1806 is used to open, rather than create, a file which contains information related to a data store, then data store create function 1806 will overwrite the file. In other words, data store create function 1806 may not be used to open an already existing file, as data store create function 1806 will instead create a new file with the same name. Data store open function 1808 is meant to be used if a file which contains information relating to a data store is already in existence. If data store open function 1808 is used in an attempt to open a non-existent file, the attempt will fail. It should be appreciated that in some embodiments data store create function 1806 and data store open function 1808 may be combined into a single function. However, for convenience and clarity, data store create function 1806 and data store open function 1808 are typically separate functions.

The use of either data store create function 1806 or data store open function 1808 serves to create an instance of the NEO_SPO_DB class as described with respect to FIG. 2. When an object is created using the static create and open functions related to the instance of the NEO_SPO_DB class, the object represents an instance of the NEO_SPO_Object class, which was also described above with respect to FIG. 2. A pluggable back-end also defines new classes similar to NEO_Real_SPO_DB and NEO_Real_SPO_Obj. Any instance of such a class is also an instance of NEO_SPO_DB or NEO_SPO_Obj, respectively, due to the inheritance relationship indicated by arrows 221 and 211 of FIG. 2.

Although only one embodiment of the present invention has been described, it should be understood that the present invention may be embodied in many other specific forms without departing from the spirit or the scope of the present invention. In the described embodiment, although only one configuration of an object identifier data structure has been described, it should be appreciated that the object identifier data structure may be widely varied within the scope of the present invention. Similarly, the structure of a data store may also be widely varied. Further, steps involved with methods of calling reading from and writing data to a data store, and creating and committing data stores may be reordered. Steps may also be removed or added without departing from the spirit or the scope of the present invention. Therefore the described embodiments should be taken as illustrative and not restrictive, and the invention should be defined by the following claims and their full scope of equivalents.

What is claimed:

1. In a distributed object system having persistent objects installed thereon, a method for managing persistence data for the installed persistent objects, the persistence data being written to a data store, the persistence data including a persistent object attribute having a persistent object attribute value, the method comprising the steps of:

a) marshaling the persistent object attribute value into a marshal buffer, wherein marshaling the persistent object value into the marshal buffer provides an encoded persistent object attribute value;

b) updating the encoded persistent object attribute value to provide an encoded updated persistent object attribute value, wherein the encoded updated persistent object attribute value is provided in the marshal buffer;

c) unmarshaling the encoded updated persistent object attribute value from the marshal buffer to provide a decoded updated persistent object attribute value; and d) writing the decoded updated persistent object attribute value to the data store.

2. The method of claim 1, further including the step of retrieving the persistent object attribute value from the persistent object prior to the step of marshaling the persistent object attribute value into the marshal buffer.

3. The method of claim 1, further including the step of retrieving the persistent object attribute value corresponding to the persistent object attribute from the data store prior to the step of marshaling the persistent object attribute value into the marshal buffer.

4. The method of claim 3, wherein said step of retrieving the persistent object attribute value corresponding to the persistent object attribute from the data store includes the steps of:

a) opening the data store;

b) extracting an index of persistent object attributes contained in the data store from the data store;

c) searching the index of persistent object attributes contained in the data store to determine the location of the persistent object attribute in the data store;

d) identifying the location of the persistent object attribute in the data store; and e) returning the persistent object attribute value corresponding to the persistent object attribute.

5. The method of claim 4, wherein the step of opening the data store includes the steps of:

a) selecting an appropriate data store file associated with the data store;

b) creating the marshal buffer using the appropriate data store file;

c) creating a data store root object associated with the data store; and d) registering the data store with a data store registry.

6. The method of claim 5, further including the steps of:

a) unmarshaling a data store version record corresponding to the data store file; and b) determining whether the data store file is supported as the data store.

7. The method of claim 6, further including the step of unmarshaling persistence data associated with the persistent object attribute from the data store file.

8. The method of claim 1, wherein the step of writing the decoded updated persistent object attribute value to the data store comprises the steps of:

a) extracting an index of persistent object attributes stored in the data store;

b) determining whether the persistent object attribute is located in the data store using the index of persistent object attributes;

c) adding the persistent object attribute to the data store if it is determined that the persistent object attribute is not located in the index of persistent object attributes; and d) writing the persistent object attribute value to the data store at location corresponding to the persistent object attribute when it is determined that the persistent object attribute is located in the data store.

9. In a distributed object system having persistent objects installed thereon, a method for managing persistence data for the installed persistent objects, the persistence data being written to a data store, the persistence data further including a persistent object attribute having a persistent object attribute value and a persistent object attribute name, the method comprising the steps of:

a) invoking a first method on the distributed object system, the first method being associated with the persistent object attribute having the persistent object attribute value and the persistent object attribute name;

b) marshaling the persistent object attribute value into a marshal buffer to provide thereby an encoded persistent object attribute value;

c) updating the encoded persistent object attribute value to provide an encoded updated persistent object attribute value;

d) unmarshaling the encoded updated persistent object attribute value from the marshal buffer to provide a decoded updated persistent object attribute value; and e) writing the decoded updated persistent object attribute value to the data store.

10. The method of claim 9, further including the step of retrieving the persistent object attribute value from the persistent object prior to the step of marshaling the persistent object attribute value into the marshal buffer.

11. The method of claim 9, further including the step of retrieving the persistent object attribute value from the data store prior to the step of marshaling the persistent object attribute value into the marshal buffer.

12. The method of claim 11, wherein the step of retrieving the persistent object attribute value from the data store includes the steps of:

a) opening the data store;

b) extracting from the data store an index of persistent object attributes, the index of persistent object attributes being contained in the data store;

c) searching the index of persistent object attributes contained in the data store using the persistent object attribute name to determine a location of the persistent object attribute in the data store; and d) returning the persistent object attribute value corresponding to the persistent object attribute.

13. The method of claim 12 wherein the step of opening the data store includes the steps of:

a) selecting an appropriate data store file;

b) creating the marshal buffer using the appropriate data store file;

c) unmarshaling a data store version record corresponding to the data store file;

d) determining whether the data store file is supported as the data store;

e) creating a data store root object associated with the data store when it is determined that the data store file is supported as the data store;

f) unmarshaling the persistence object attribute value associated with the persistent object attribute from the data store file; and g) registering the data store with a data store registry.

14. The method of claim 9, wherein the step of writing the decoded updated persistent object attribute value to the data store includes the steps of:

a) extracting an index of persistent object attributes stored in the data store;

b) finding the location of the persistent object attribute in the data store using the persistent object attribute name and the index;

c) adding the persistent object attribute to the data store when the persistent object attribute is not found in the index;

d) and writing the persistent object attribute value to the data store at the location corresponding to the persistent object attribute when the persistent object attribute is found in the index.

15. A distributed object system arranged to store persistence data for installed persistent objects in a data store, the persistence data being written to a data store, the persistence data further including a persistent object attribute having an associated persistent object attribute value, the distributed object system comprising:

a) a processor;

b) a mass storage mechanism on which the persistence data is stored;

c) a marshaling mechanism for encoding the persistent object attribute value into a marshal buffer to provide thereby an encoded persistent object attribute value; and d) an unmarshaling mechanism for decoding the encoded persistent object attribute value from the marshal buffer to provide a decoded persistent object attribute value.

16. The distributed object system arranged to store persistence data for installed persistent objects in a data store as recited in claim 15 further including:

a) a data store selector for selecting an appropriate data store file associated with the data store;

b) a data store creator for creating a data store root object associated with the data store; and c) a registration mechanism for registering the data store with a data store registry.

17. The distributed object system arranged to store persistence data for installed persistent objects in a data store as recited in claim 16 further including a support mechanism for determining whether the data store file is supported as the data store.

18. The distributed object system arranged to store persistence data for installed persistent objects in a data store as recited in claim 15 further including:

a locator for finding the location of the persistent object attribute in the data store; and an appending mechanism for adding the persistent object attribute to the data store when the persistent object attribute is not found in the data store.

19. A computer program product including a computer-usable medium having computer-readable code devices embodied thereon for implementing a persistence data storage framework, the persistence data storage framework comprising:

a) an instance of a persistent object class, the instance of the persistent object class including a set of persistent object attribute values;

b) a persistence data storage mechanism associated with the instance of the persistent object class; and c) instances of classes which define a pluggable back-end associated with the persistence data storage mechanism.

20. A computer program product comprising a computer-usable medium having computer-readable code embodied thereon as recited in claim 19 wherein the pluggable back-end is a data store.

21. A computer program product comprising a computer-usable medium having computer-readable code embodied thereon as recited in claim 19 further comprising an instance of a method-table class associated with the instance of the persistent object class, wherein the instance of the method-table class includes methods pertaining to the set of persistent object attribute values.

22. A computer program product comprising a computer-usable medium having computer-readable code embodied thereon as recited in claim 21 wherein the methods pertaining to the set of persistent object attribute values includes at least one of a set attribute method and a get attribute method.

23. A computer program product comprising a computer-usable medium having computer-readable code embodied thereon as recited in claim 19 wherein the persistence data storage mechanism comprises instances of classes with methods associated therewith, the instances of classes and the methods being used to associate the instance of the persistent object class with the pluggable back-end.

24. A computer program product including a computer-usable medium having computer-readable code devices embodied thereon for storing state data for persistent objects in a data store defined within a distributed object system, the data store containing information corresponding to the persistent objects, the data store further containing information corresponding to attributes used to invoke methods in the distributed object system, the data store comprising:

a) a root node which identifies a version of the data store;

b) at least one persistent object associated with the root node;

c) at least one attribute associated with the persistent object, the at least one attribute including an attribute name and an attribute value;

d) an object identifier associated with the persistent object which identifies the persistent object; and e) at least one type identifier which associates the persistent object with a corresponding method table, wherein the method table includes at least one method which is arranged to be invoked by the persistent object.

25. A computer program product as recited in claim 24 wherein the object identifier includes:

a) a database identifier which identifies the data store with which the object identifier is associated;

b) an object identifier index which identifies whether the persistent object is a valid persistent object; and c) a subcontract identifier which identifies an associated subcontract.

26. A computer program product as recited in claim 25 wherein the database identifier includes:

a) a time stamp which identifies the time at which the data store was last modified;

b) a process identifier which identifies a process with which the data store is associated; and c) a counter which represents the number of times the data store is opened.

27. A computer program product as recited in claim 25 wherein the object identifier index includes:

a) an index which represents a location of the persistent object within a sequence of the persistent objects associated with the data store; and b) a counter which identifies whether the persistent object is valid.

28. A computer system for storing persistence data for a first persistent distributed object, the persistence data for the first persistent distributed object including an attribute name and an attribute value, the computer system comprising:

a) a persistent data storage mechanism arranged to process and store the persistence data for the first persistent distributed object; and b) a representation of a data store which is configured to be adapted such that different back-end representations of the data store may be included with the persistent object storage mechanism.

29. A computer system as recited in claim 28 wherein the data store is arranged to store the attribute name and the attribute value of the persistence data for the first persistent distributed object.

30. A computer system as recited in claim 28, wherein the data store includes a plurality of objects, which objects are coupled with the first persistent distributed object through at least one inheritance relationship defining operations for exchanging an attribute value between the data store and the first persistent distributed object and for manipulating the attribute value in the data store.

31. A computer system as recited in claim 30, wherein the inheritance relationship between the data store and the first persistent distributed object comprises at least one object class defining a persistence data storage mechanism through which persistence data can be written and retrieved from the data store.

32. A computer system as recited in claim 31, wherein the first persistent distributed object is coupled with the persistence data storage mechanism through an inheritance relationship between a method table class contained in the first persistent distributed object and a method table registry class contained in the persistence data storage mechanism.

33. A computer system as recited in claim 32, wherein the inheritance relationship further includes a relationship between the persistent class that includes the attributes of the first persistent distributed object and at least one class contained in the persistence data storage mechanism that defines operations on the attribute values associated with the attributes.

34. A computer system as recited in claim 31, wherein the data store is coupled with the persistence data storage mechanism through at least one inheritance relationship which includes an inheritance relationship between a root object class contained in the data store and the persistence data storage mechanism.

35. A computer system as recited in claim 34, wherein the data store is coupled with the persistence data storage mechanism through at least one inheritance relationship which includes an inheritance relationship between a database object class contained in the data store and the persistence data storage mechanism.

\* \* \* \* \*